United States Patent [19]

Petersen et al.

[11] Patent Number: 5,802,050
[45] Date of Patent: Sep. 1, 1998

[54] MINICELL SEQUENCE NUMBER COUNT

[75] Inventors: Lars-Göran Petersen, Tumba; Lars Göran Wilhelm Eneroth, Tyresö, both of Sweden

[73] Assignee: Telefonaktiebolaget LM Ericsson, Stockholm, Sweden

[21] Appl. No.: 661,161

[22] Filed: Jun. 10, 1996

[51] Int. Cl.$^6$ ........................................................ H04J 3/24
[52] U.S. Cl. ........................... 370/394; 370/395; 370/473
[58] Field of Search ......................... 370/252, 394, 370/395, 473, 474; 371/32; 395/182.16

[56] References Cited

U.S. PATENT DOCUMENTS 5,583,859  12/1996  Feldmeier .............................. 370/471

FOREIGN PATENT DOCUMENTS

WO 95/33309  12/1995  WIPO .

OTHER PUBLICATIONS

Ryoichi Iwase et al., "A Bit Error and Cell Loss Compensation Method for ATM Transport Systems", Electronics and Communications in Japan, Part 1, vol. 76, No. 3, Mar. 1, 1993, pp. 16–30.

Zsehong Tsai et al., "Performance Analysis of Two Echo Control Designs in ATM Networks", 8426 IEEE/ACM Transactions on Networking, vol. 2, No. 1, Feb. 1, 1994, pp. 30–39, New York, USA.

Hitoshi Uematsu et al., "Implementation and Experimental Results of CLAD Using SRTS Method in ATM Networks", Proceedings of the Global Telecommunications Conference (Globecom), San Francisco, Nov. 28–Dec. 2, 1994, IEEE, pp. 1815–1821.

*Primary Examiner*—Hassan Kizou
*Attorney, Agent, or Firm*—Burns, Doane, Swecker & Mathis, L.L.P.

[57] ABSTRACT

The process of detecting lost data cells in a telecommunication system that employs Asynchronous Transfer Mode is significantly improved in terms of bandwidth utilization by using an optional minicell or ATM cell sequence count. This may be accomplished by inserting the minicell or ATM cell sequence count into the ATM cell stream at intervals that can be adjusted at the transmitting station.

32 Claims, 20 Drawing Sheets

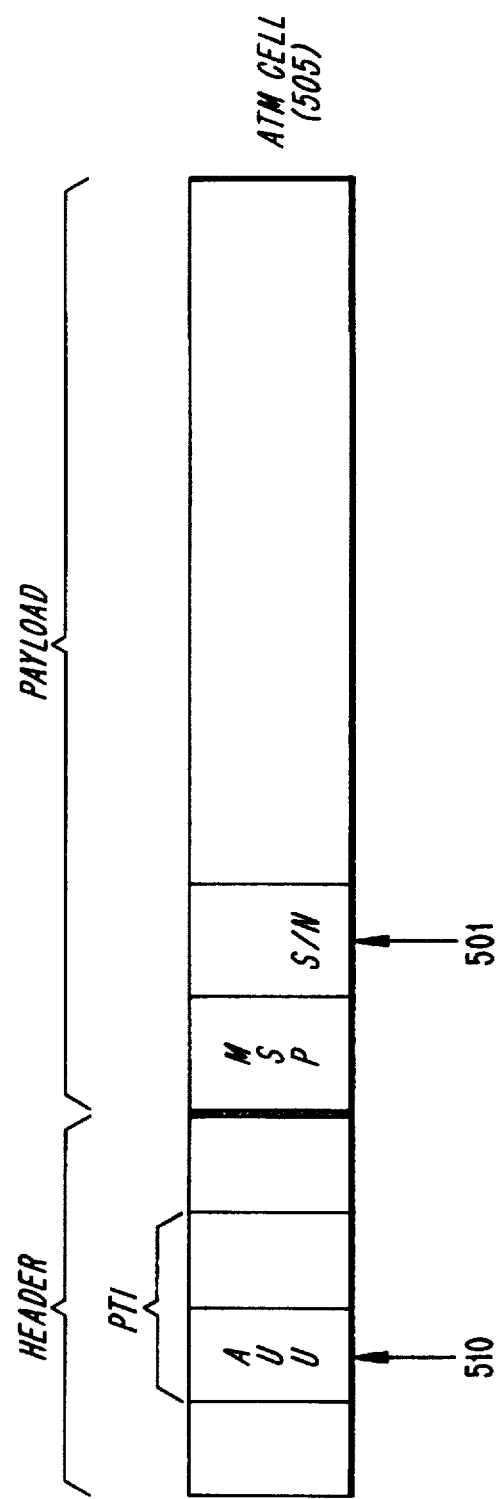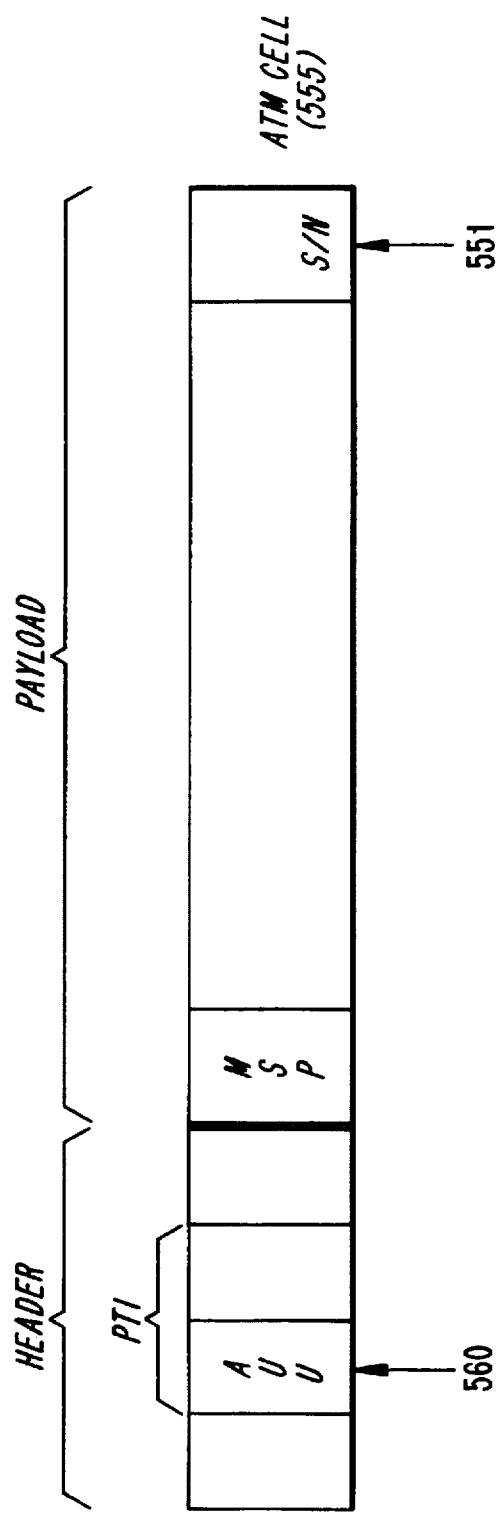

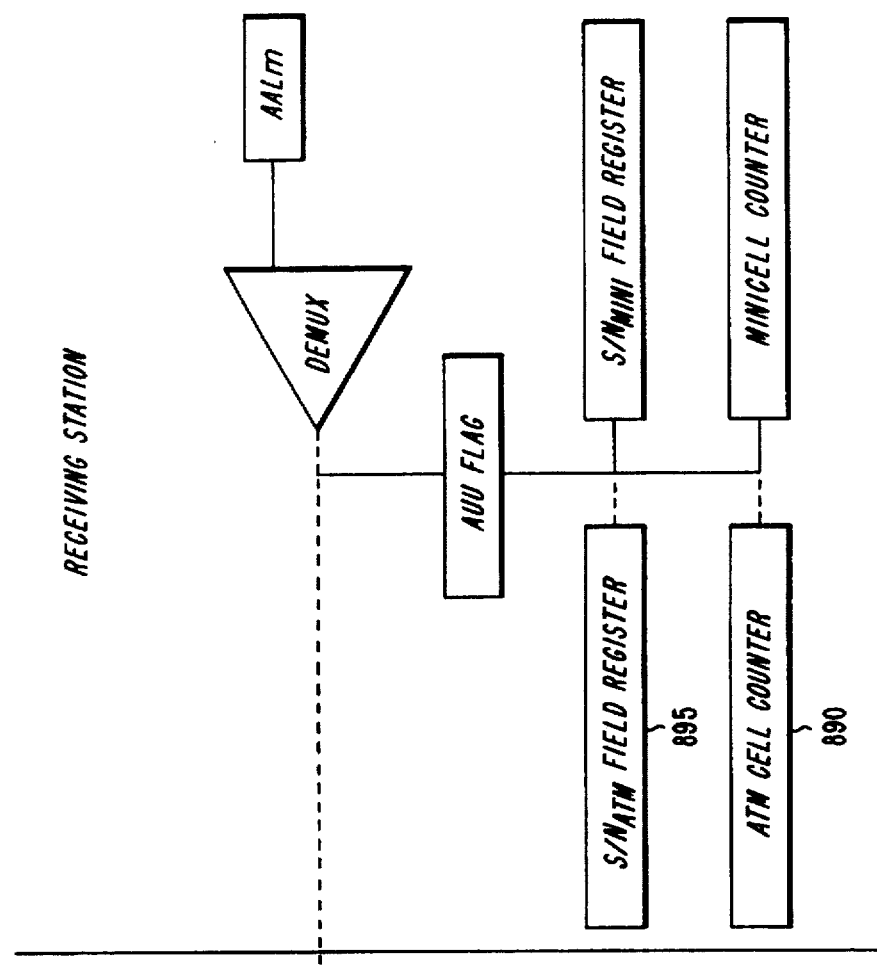
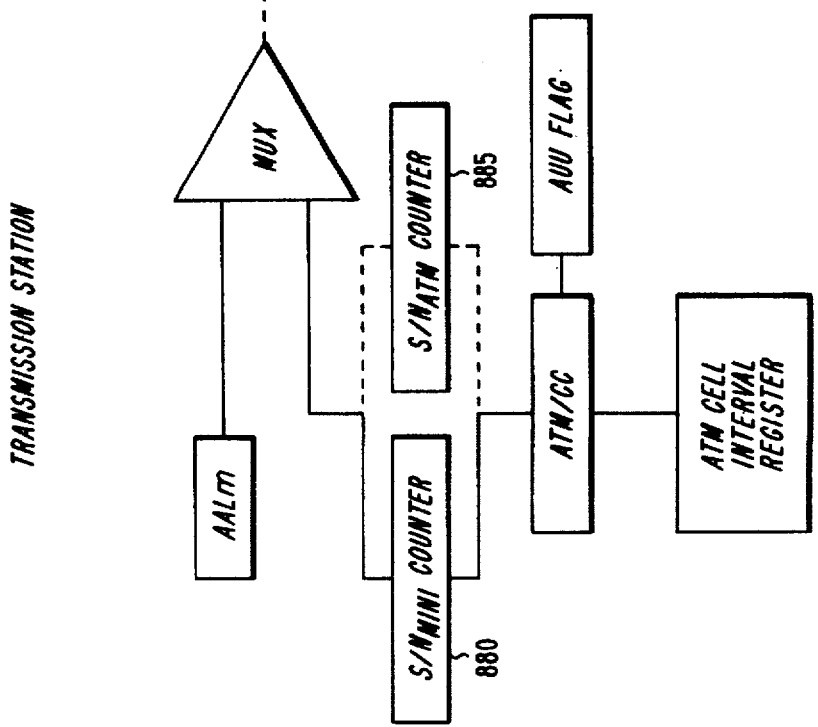
FIG. 8B

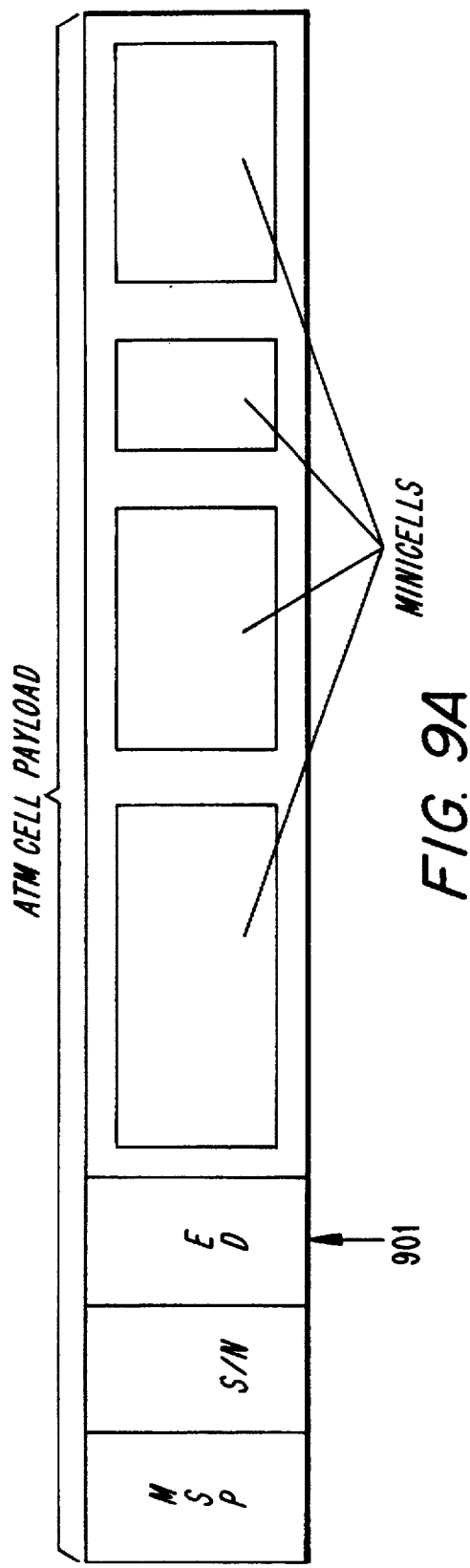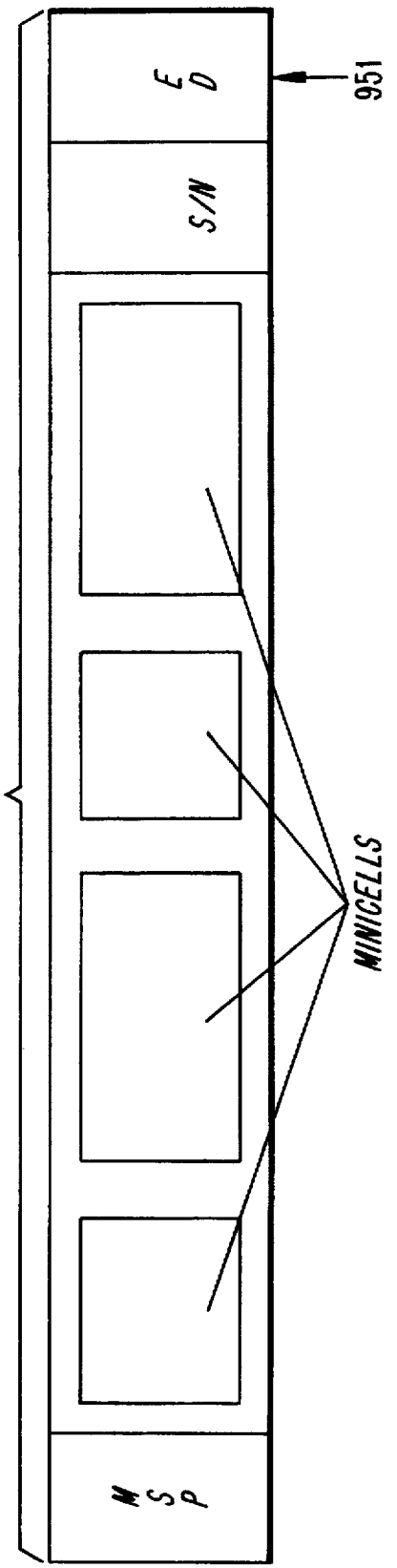

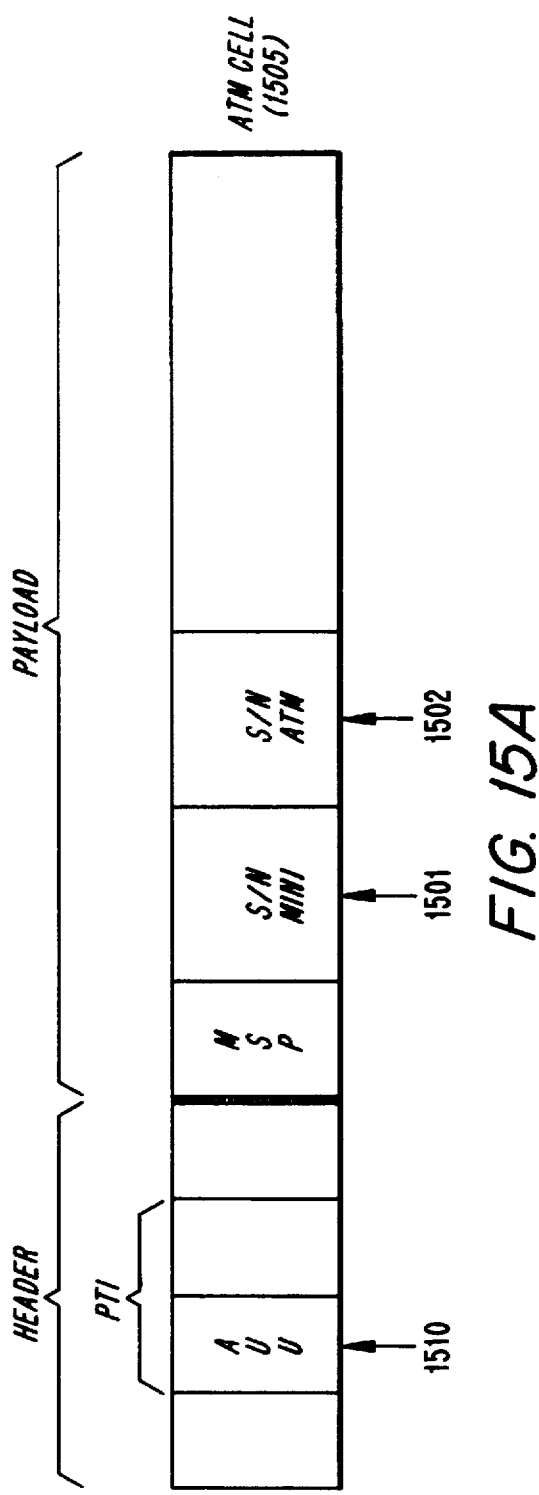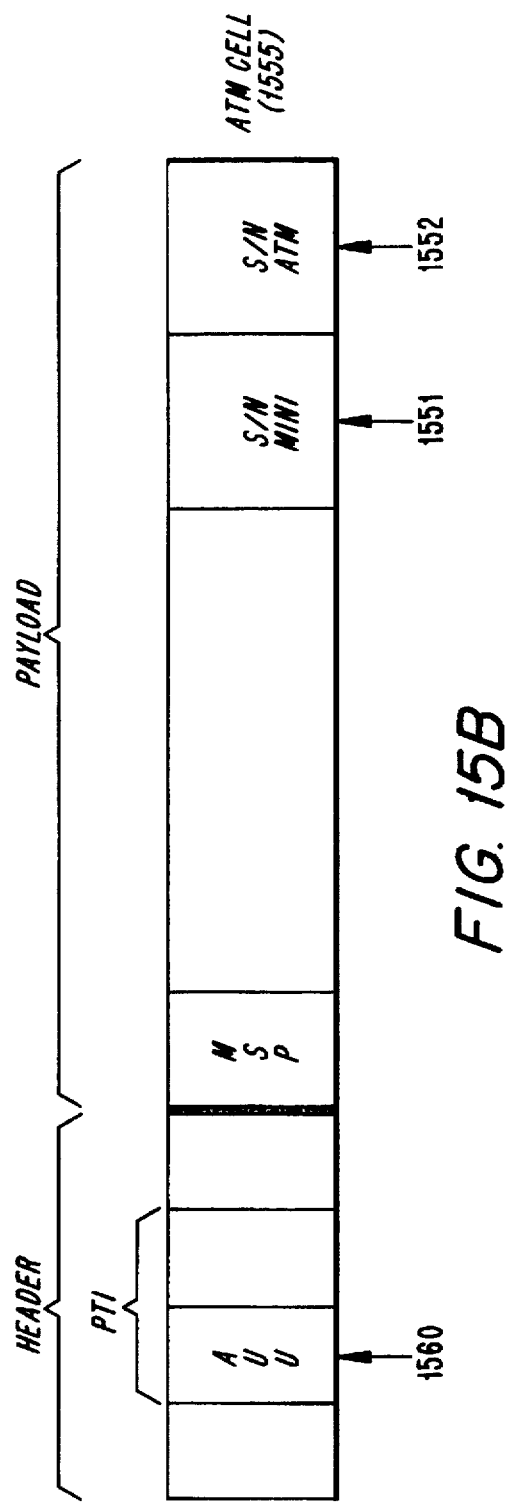

MINICELL SEQUENCE NUMBER COUNT

BACKGROUND

The present invention relates to the detection of lost data cells when using the Asynchronous Transfer Mode protocol (ATM) and the ATM Adaptation Layer for generating minicells (AALm). More particularly, the present invention relates to a bandwidth-efficient method and apparatus for detecting the loss of one or more minicells or ATM cells during transmission between two end stations.

Asynchronous Transfer Mode (ATM) is a standard protocol that is useful for transmitting telecommunication data within a telecommunication system (e.g., a cellular telecommunication system). Data is transmitted from a transmission station to a receiving station in fixed-size data packets called ATM cells. Each ATM cell contains a 48 octet payload and a 5 octet header. ATM is well known in the art and is commonly used for high bit rate applications (e.g., multimedia communication). However, ATM can be used for low bit rate applications as well (e.g., cellular voice communication).

When using ATM for low bit rate communication, such as cellular voice communication, it is often advantageous to multiplex small packets of compressed data into the ATM cell stream as illustrated by process 100 in FIG. 1. These small packets are often referred to as "minicells". Minicells, though typically shorter than ATM cells, are similar in the sense that they also contain a header, usually 2 octets in length, and a payload with a fixed or variable length. In addition, minicells can stretch over ATM cell borders as illustrated by minicell 101 in FIG. 1. In general, multiplexing minicells into the ATM stream improves bandwidth utilization and lowers transmission costs.

FIG. 2 illustrates the format of a typical minicell 200. The two octet header includes a circuit identifier (CID) field 201, a minicell payload length indicator 202, and an error detection field 203 (e.g., a cyclic redundancy code (CRC) or bit interleaved parity code. This minicell format is well known in the art.

In a layered communication system, the mechanism for generating these additional cells, or minicells, is referred to as the ATM Adaption Layer or AALm, where "m" stands for "minicell." This additional process or "layer" can be further subdivided into three sublayers as illustrated in FIG. 3. The convergence sublayer 301 allows the AALm to interface with the telecommunication application. The assembly and disassembly sublayer 302 inserts user data (e.g., voice communication data) into minicells at the transmission station and extracts user data from the minicells at the receiving station. The multiplexing and demultiplexing sublayer 303 inserts minicells into the payload of ATM cells at the transmission station and extracts minicells from the ATM cell payloads at the receiving station.

A telecommunication system that employs ATM and AALm must address several concerns. One such concern is the ability to maintain minicell alignment, so that when ATM cells containing one or more minicells arrive at the receiving station, the receiver knows where each minicell starts and ends (i.e., where the first octet and last octet are located in the ATM cell stream). If there is no minicell alignment, the receiving station will be unable to accurately demultiplex the minicells from the ATM cell payloads, and unable to extract the user data from the minicells.

FIG. 4 illustrates how prior methods typically handle minicell alignment. For example, most prior methods employ a minicell start pointer (MSP) 401 at the beginning of certain ATM cells. The MSP 401 identifies the starting location (octet) 402 of the first complete minicell 403 within the ATM cell payload. The MSP 401 is typically six bits in length, so that it can identify any of the 48 octets which make up the standard ATM payload. A two bit extension is also typically provided for checking parity. As mentioned previously, each minicell header contains a length indicator field 203 (see FIG. 2), which identifies the length of the corresponding minicell in terms of the number of octets that make up the minicell payload. Alignment can then be maintained by identifying the location of the first complete minicell using the MSP 401 and, thereafter, counting the octets of each minicell according to the length indicator value in each minicell header.

Another major concern for a telecommunication system that employs ATM and AALm, is the detection and reporting of lost minicells. Minicells can become lost during transmission between two end stations (e.g., in a cellular system, a base station and a mobile switching center). There are many reasons why minicells become lost; however, one common cause is the loss of one or more ATM cells due to a bad transmission line (e.g., a transmission line with a significant level of interference). Another common cause for lost minicells is the misrouting of ATM cells due to an equipment fault (e.g., a bad switch).

Prior methods detect lost ATM cells by inserting a mandatory Sequence Number (SN) field into each and every ATM cell. The SN field is typically three or four bits in length and it serves as a modulo 8 or modulo 16 counter respectively. The value stored in the SN field of each ATM cell tracks the number of ATM cells that have been transmitted to the receiving station. Similarly, the receiving station tracks the actual number of ATM cells received with a modulo 8 or modulo 16 counter respectively. By comparing the value stored in the SN field and the value stored in the modulo 8 or modulo 16 counter at the receiving station, the number of lost ATM cells can be detected. If ATM cells have been lost, it is also likely that minicell alignment has been lost. The problem with the prior method is that inserting a mandatory SN field into every ATM cell is not always necessary, especially when transmission reliability is very good and few, if any, minicells are being lost. Therefore, inserting a mandatory SN field into every ATM cell needlessly expends precious bandwidth (i.e., bandwidth is wasted).

SUMMARY

The present invention provides a more bandwidth-efficient method and apparatus for detecting lost minicells or lost ATM cells by generating an optional SN field at varying intervals as determined by the transmission station or the transmission station operator.

The herein-below and other objects of the invention are accomplished through a method and apparatus as defined in the accompanying claims.

It is an object of the present invention to detect when minicells and/or ATM cells have been lost during transmission between two telecommunication end stations.

It is another object of the present invention to detect lost minicells or ATM cells in a bandwidth-efficient way.

It is still another object of the present invention to provide information regarding the number of lost minicells or ATM cells to the telecommunication system so corrective action can be taken, if necessary.

It is yet another object of the present invention to accomplish the detection of lost minicells and lost ATM cells in a more bandwidth-efficient way by employing an optional sequence number (S/N) field.

In accordance with one aspect of the present invention, the foregoing and other objects are achieved by a method and an apparatus for detecting lost data, comprising the steps of: transporting at least one data cell that does not contain any data packet sequence number to a receiving station; generating a data packet sequence number that represents a number of data packets transmitted via data cells to the receiving station; inserting the data packet sequence number into a select data cell as a function of a predefined transmission interval; transporting the select data cell that contains the data packet sequence number to a receiving station; and at the receiving station, determining whether data has been lost as a function of the data packet sequence number.

In accordance with another aspect of the present invention, the foregoing and other objects are achieved by a method and an apparatus for detecting lost data, comprising the steps of: generating a data packet sequence number that represents a number of data packets transmitted via data cells to the receiving station; inserting the data packet sequence number into a select data cell as a function of a predefined and adjustable transmission interval; transporting the data cell containing the data packet sequence number to a receiving station; and determining whether data has been lost as a function of the data packet sequence number.

BRIEF DESCRIPTION OF THE DRAWINGS

The objects and advantages of the invention will be understood by reading the following detailed description in conjunction with the drawings in which:

FIGS. 5A and 5B illustrate two different configurations for storing a S/N field in the payload of ATM cells;

FIGS. 8A and 8B are block diagrams of an apparatus for transmitting and receiving an S/N field transported in the payload of an ATM cell;

FIGS. 9A and 9B illustrate the use of an error detection field in conjunction with the S/N field;

FIGS. 15A and 15B illustrate two different configurations for storing both a S/N field for minicells and an SN field for ATM cells in the payload of ATM cells.

DETAILED DESCRIPTION

Figure 1:
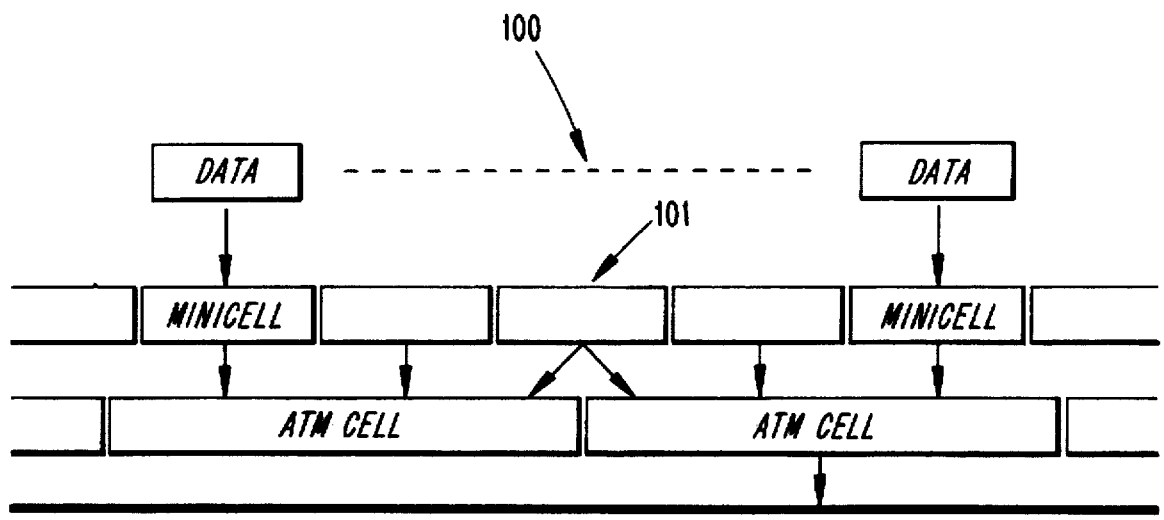
FIG. 1 is a diagram illustrating the insertion of user data into minicells and the multiplexing of minicells into the payload of ATM cells.
Figure 2:
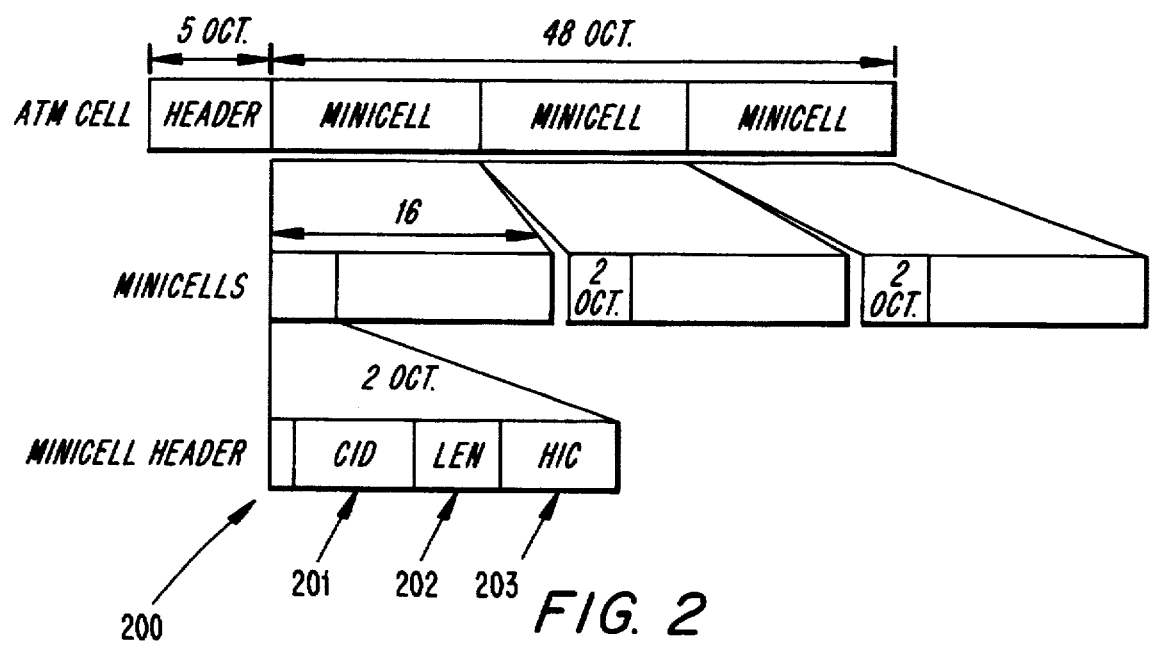
FIG. 2 is a diagram depicting the format of a typical minicell.

In a first exemplary embodiment of the invention a telecommunication system employs an optional and adjustable sequence number (S/N) field to detect the loss of minicells during transmission from a transmission station to a receiving station. In accordance with this first exemplary embodiment, the transmission station inserts the S/N field into the payload of an ATM cell, for example, the S/N field 501 in ATM cell 505 as illustrated in FIG. 5A, or the S/N field 551 in ATM cell 555 as illustrated in FIG. 5B. FIGS. 5A and 5B also illustrate that the S/N field may be inserted anywhere in the ATM cell payload. However, the two most preferable locations would be in the second octet of the ATM cell payload, just after the MSP, as illustrated by S/N field 501 in FIG. 5A, or in the last octet of the ATM cell payload, as illustrated by S/N field 551 in FIG. 5B.

Unlike prior methods, which insert a S/N field into every ATM cell payload, the invention gives the system operator, or the transmission station (if automated), the option of inserting the S/N field into fewer than every ATM cell. The system operator or the transmission station can accomplish this by predefining a transmission interval. If, for example, the operator at the transmission station determines that it is not necessary to insert a S/N field into every ATM cell, the operator can define an ATM cell interval I, which results in the transmission station inserting a S/N field into every $I^{th}$ ATM cell. The operator may take this action when the signal quality of the transmission link is very good, and taking up valuable bandwidth in each and every ATM cell is not warranted. However, when the signal quality is bad due to extremely high interference levels, the operator may decide that it would be prudent to decrease the ATM cell interval at the expense of bandwidth.

Since a S/N field will no longer appear in every ATM cell, the receiving station must be instructed as to whether to look for a S/N field in the ATM cell payload. This can be accomplished by designating a single bit in each ATM cell header to identify whether a S/N field is present or absent in the payload. For example, if the bit has a value of "0", it may indicate to the receiving station that a S/N field is present in the payload. If, on the other hand, the bit has a value of "1", it may indicate to the receiving station that a S/N field is not present in the payload. Although one skilled in the art will readily understand that any bit in the ATM cell could be used for such a purpose, the bit reserved for the ATM User-to-User (AUU) data in the Payload Type Identifier (PTI) field in each ATM cell header is preferable. For example, the AUU data bit 510 in FIG. 5A or the AUU data bit 560 in FIG. 5B may be used for this purpose. In general, it is well known in the art that the AUU data bit can be used for various user operations such as the one described hereinabove.

Figure 6A:
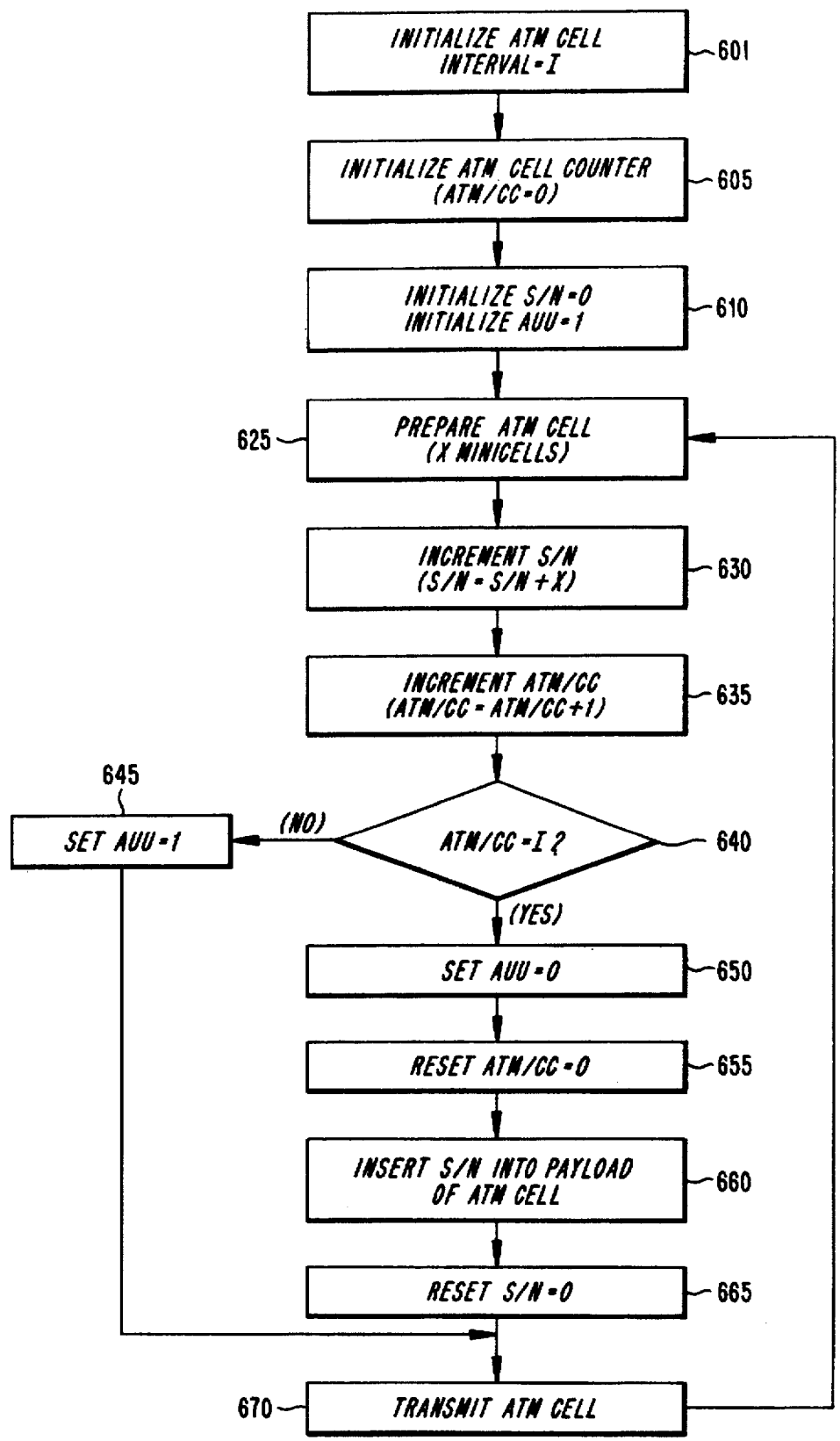
FIGS. 6A and 6B are flow charts illustrating two methods for transmitting S/N fields in the payload of ATM cells.

FIG. 6A illustrates a method that may be employed by the transmission station to implement the first exemplary embodiment described above. As previously stated, the operator at the transmission station or the transmission station itself may decide to establish or change the transmission interval, for example, an ATM cell interval, as illustrated by block 601. Since the transmission station is to insert a S/N field every $I^{th}$ ATM cell, it will be necessary to keep track of each ATM cell transmitted. This can be accomplished with an ATM cell counter (ATM/CC) which is initially set to "0", as shown in block 605. Because the ultimate purpose is to detect lost minicells, it will also be necessary to maintain a S/N counter which tracks the actual number of minicells transmitted to the receiving station. The S/N counter is also initially set "0", as illustrated in block 610. Likewise, the AUU bit in the corresponding ATM cell header is initially set to "1".

Once the counters and the AUU bit are initialized, the transmission station prepares the ATM cell for transmission to the receiving station, as illustrated by block 625. For the purpose of illustration, the ATM cell payload will contain X number of minicells, including any minicell that overlaps into the next ATM cells; therefore, X is an integer value. The transmitting station then increments the S/N counter by the value of X and the ATM/CC by the value of "1", as illustrated by blocks 630 and block 635 respectively.

If, after incrementing the ATM/CC, the value of the ATM/CC is not equal to the value I, as illustrated by the "NO" path out of decision block 640, the transmission station sets the AUU bit equal to "1", as illustrated by block 645. This indicates that there will be no S/N field in the ATM cell. The ATM cell is then transmitted to the receiving station, as illustrated by block 670.

However, if after incrementing the ATM/CC, the value of the ATM/CC is equal to the value I, as illustrated by the "YES" path out of decision block 640, the transmission station sets the AUU bit to "0", as illustrated in block 650. This indicates that the ATM cell will contain an AUU bit with a value of "0" and a S/N field. The transmission station then resets the ATM/CC to zero, as illustrated by block 655, the incremented value of the S/N counter is inserted into the payload of the ATM cell, as illustrated in block 660, the S/N counter is then reset to "0", as illustrated by block 665, and the ATM cell is transmitted to the receiving station, as shown in block 670.

Figure 7A:
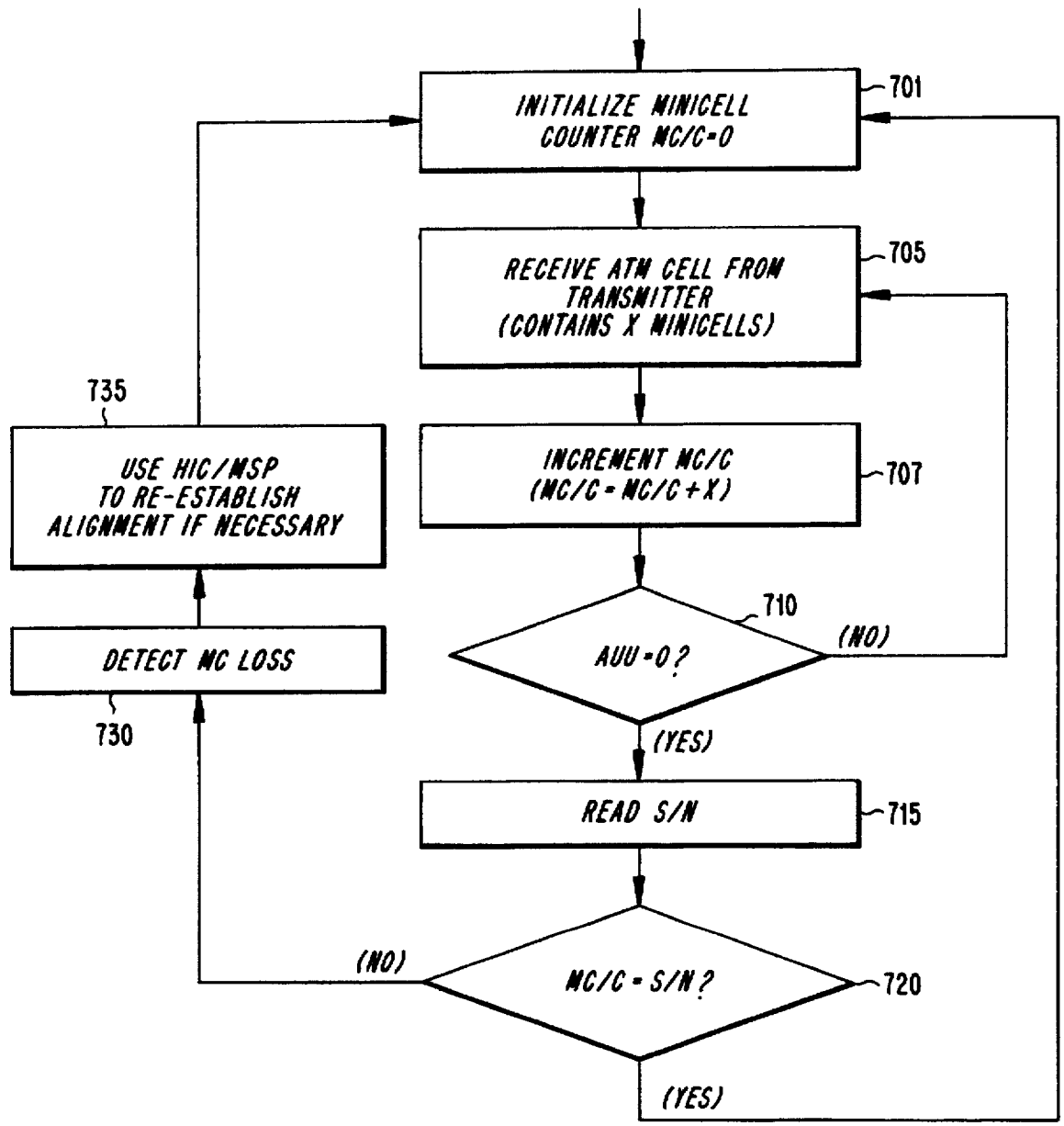
FIGS. 7A and 7B are flow charts illustrating two methods for receiving S/N fields in the payload of ATM cells and using them to detect lost data.

FIG. 7A illustrates a method that may be employed by the receiving station to implement the first exemplary embodiment described above. Again, since the ultimate purpose is to detect lost minicells, the receiving station must keep track of the actual number of minicells received. This can be accomplished with a minicell counter (MC/C) which is initially set to "0", as illustrated by block 701. The receiving station then receives an ATM cell from the transmission station, as illustrated by block 705. For the purpose of illustration, the ATM cell contains X number of minicells. At this point, the receiving station increments the MC/C by X, the number of minicells in the corresponding ATM cell, as illustrated by block 707. If the AUU bit of the next ATM Cell is equal to 0, as illustrated by the "YES" path out of decision block 710, indicating the presence of a S/N field in the payload, the receiving station will read and interpret the appropriate octet in the ATM cell payload as the S/N field, as illustrated by block 715. In order to determine whether any minicells have been lost since receiving the previous S/N field, the receiving station compares the value stored in the MC/C with the value stored in the S/N field, as illustrated by decision block 720. If the value of the MC/C equals the value stored in the S/N field, as illustrated by the "YES" path out of decision block 720, the receiving station presumes that no minicells have been lost and the receiving station resets MC/C to the value "0" and gets ready to receive the next ATM cell.

If the MC/C does not equal the value stored in the S/N field, as illustrated by the "NO" path out of decision block 720, the receiving station presumes that minicells have been lost, as illustrated by block 730. The difference between the value stored in the MC/C and the value of the present S/N field reflects the number of minicells actually lost. This information can be used by the telecommunication system for various purposes. For example, it may be used to detect system hardware problems, or it may be used to determine if steps must be taken to counter high levels of interference affecting the communication channel. The receiving station may then re-establish minicell alignment, if necessary, by employing the MSP or a header integrity check (HIC) code as described in U.S. patent application Ser. No. 08/626,000 and incorporated by reference herein. This step is illustrated in block 735. Then, the MC/C is reset to "0", and the receiving station is then ready to receive the next ATM cell.

If the AUU bit is not equal to "0", as illustrated by the "NO" path out of decision block 710, indicating that a S/N field is not present in the ATM cell, the receiving station receives the next ATM cell.

Figure 8A:
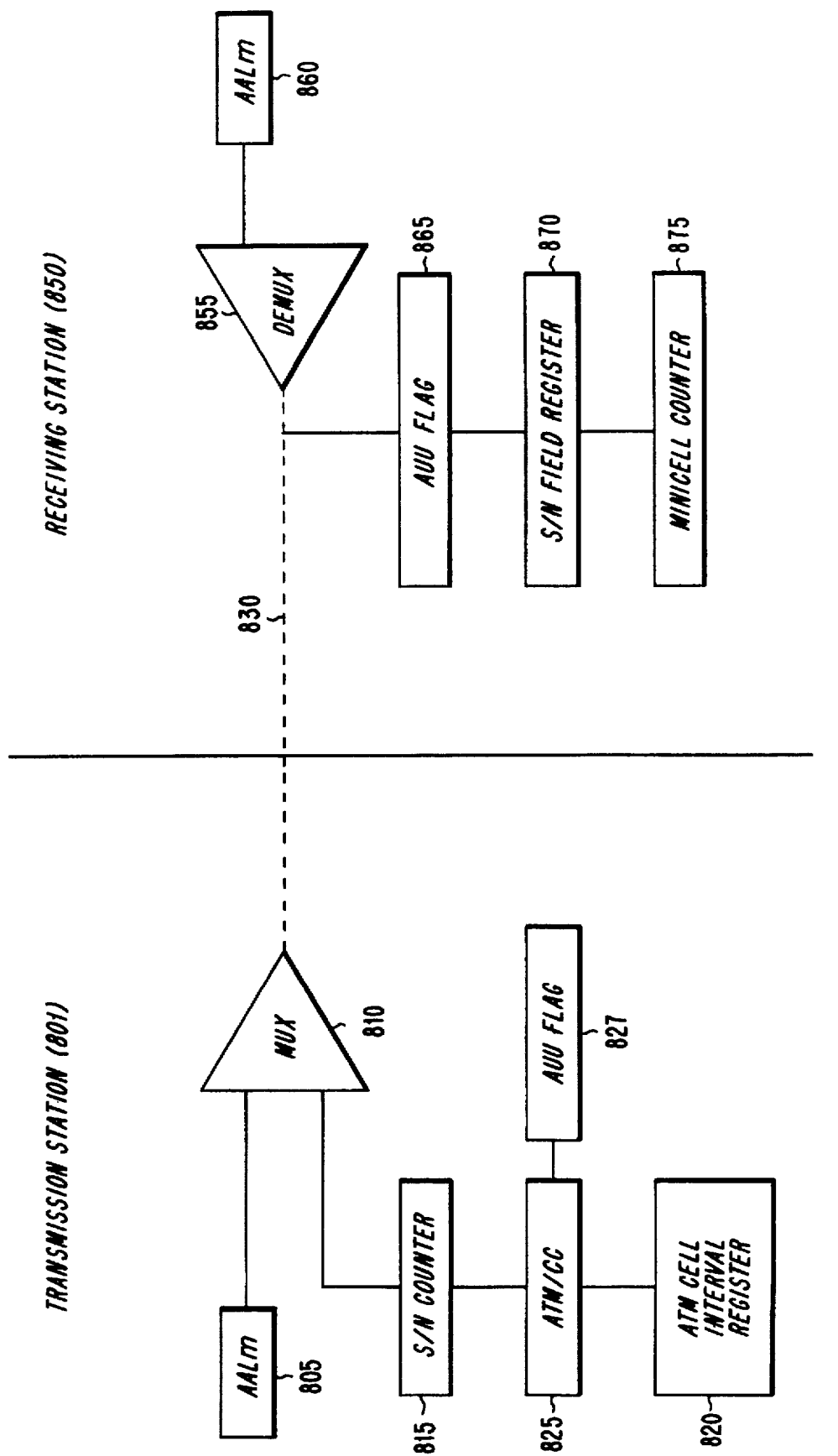

FIG. 8A illustrates a simple block diagram of an apparatus that may be used to implement the aforementioned method. At a transmission station 801, the AALm 805 generates minicells (not shown), as is well known in the art. The minicells are sequentially multiplexed into ATM cell payloads by a multiplexer 810. A S/N counter 815 is maintained to keep track of the number of minicells actually transmitted. As mentioned above, the operator may establish a predefined ATM cell interval, the value of which may be stored in a register 820. In addition, an ATM cell counter (ATM/CC) 825 is maintained. When the value stored in the ATM/CC 825 equals the value stored in the interval register 820, the transmission station will cause the multiplexer 810 to insert the value of the S/N counter 815 into the appropriate octet of the present ATM cell payload before transmitting the ATM cell to the receiving station 850. In addition, the AUU bit in the PTI field of the ATM cell header will be set to "0", in accordance with the AUU flag 827, indicating that a S/N field has been inserted into the ATM cell payload. The transmission of the ATM cell is illustrated by dashed line 830.

At the receiving station 850, the ATM cells are received, the minicells are demultiplexed by a demultiplexer 855, and the minicells are sent to the AALm 860 for disassembly (i.e., the removal of communication data from the minicells). In accordance with the first exemplary embodiment, the receiving station might also contain an AUU flag 865 for determining whether the AUU bit in the header of each incoming ATM cell is set to a "1" or "0". As stated above, a value of "0" might indicate the presence of a S/N field in the corresponding ATM cell payload. In addition, the receiving station 850 may contain a S/N field register 870 for extracting the value of the S/N field, if one exists in the present ATM cell. Finally, the receiving station may contain a minicell counter 875. The minicell counter 875 would be used for keeping track of the actual number of minicells received. By comparing the value stored in the minicell counter 875 with the value stored in the S/N field, the receiving station 850 can determine if any minicells have been lost.

Alternatively, the transmitting station and the receiving station may track ATM cells in addition to minicells. The apparatus would then include an ATM cell counter at the transmitter station and the receiver station respectively, as explained in greater detail below.

Critical communication data, such as the data stored in the S/N field, is typically protected by an error detection code, for example, a CRC or parity bits. FIGS. 9A and 9B illustrate that a dedicated error detection code 901 or 951, respectively, may be attached to the S/N field. Alternatively, the S/N field may be protected by a common error detection field (not shown) that is typically inserted at the end of the ATM cell payload to detect errors associated with the minicell headers. Common error detection fields such as HIC codes are well known in the art.

Typically, an S/N field is only 3 to 4 bits in length. However, it is possible to extend this length to increase the reliability of the method described above. For example, if the S/N field is but 3 bits in length, it can only reflect a count of 8 minicells. After the eighth minicell is transmitted, the counter will roll over from a value of 7 (i.e., 111 in binary) to a value of 0. If one ATM cell containing 8 minicells is lost, the value stored in the next S/N field will appear as though it has not changed, and the S/N field should still equal the MC/C being maintained in the receiving station. Therefore, the receiving station will assume that it has received all transmitted minicells when, in fact, 8 minicells have been lost. In general, this situation can be prevented by increasing the size of the S/N field. Although increased reliability comes at the expense of bandwidth, this can be compensated for by increasing the length of the ATM cell interval I.

Figure 10:
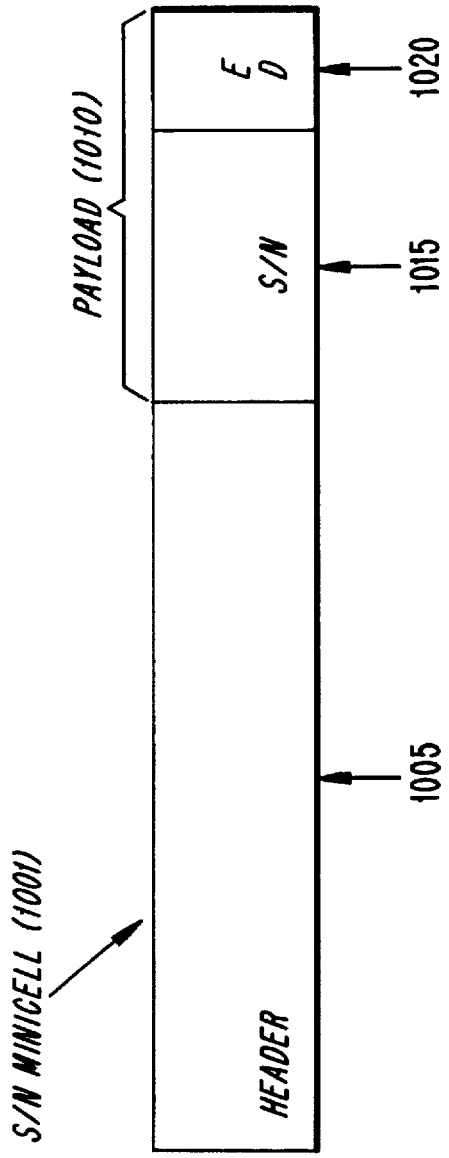
FIG. 10 illustrates the format of a S/N minicell.

In a second exemplary embodiment, a transmission station controls the detection of lost minicells by generating and transmitting a specific S/N minicell to the receiving station at a predefined transmission interval I, for example, a minicell interval. FIG. 10 illustrates an exemplary format of a S/N minicell 1001. As do all minicells, S/N minicell 1001 contains a header 1005 and a payload 1010. In addition, the header 1005 contains a CID code (not shown), typically 8 bits in length. Though all minicells contain a CID field in their respective header, the CID field associated with all S/N minicells will be a single, predefined value. This single, predefined CID value will distinguish S/N minicells from all other minicells. For illustrative purposes, the predefined CID value for all S/N minicells might be 255 (i.e., 11111111 in binary).

The payload 1010 of the S/N minicell 1001 will contain a S/N field 1015. In all respects, the S/N field is identical to the S/N field described in the first exemplary embodiment except that it is transported to the receiving station in the payload of a special minicell instead of in the second or last octet of an ATM cell payload. As previously described, the length of the S/N field may be extended to improve reliability. As previously mentioned, the S/N field may have an error detection code 1020 associated with it.

Figure 11A:
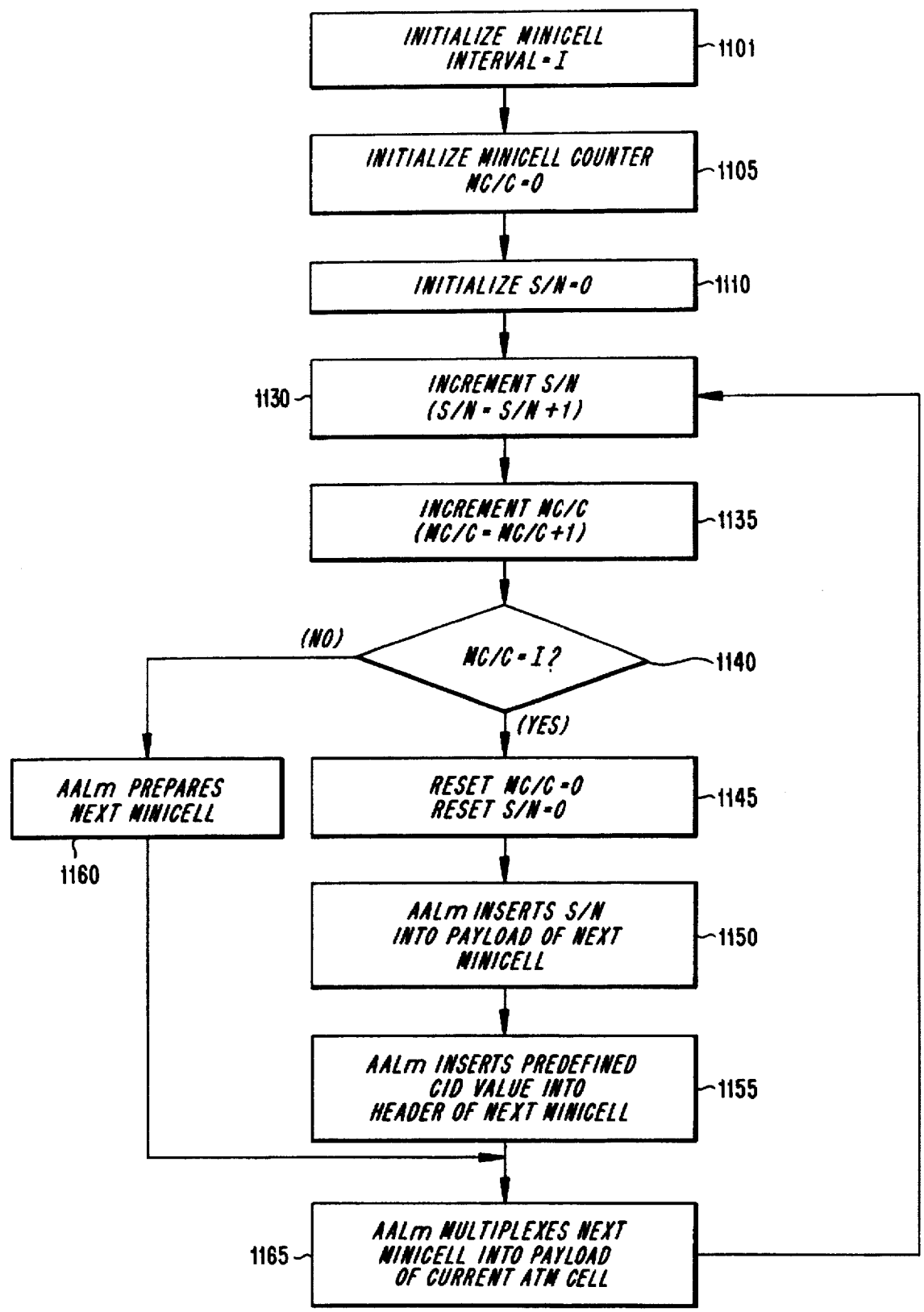
FIGS. 11A and 11B are flow charts illustrating two methods for transmitting S/N fields in the payload of S/N minicells.

FIG. 11A illustrates a method that could be used to implement the second exemplary embodiment with respect to the transmission station. A predefined transmission interval I, for example, a minicell interval, a minicell counter (MC/C), and a sequence number (S/N) counter must all be initialized, as illustrated by blocks 1101, 1105, and 1110 respectively. The AALm then increments the S/N counter and the MC/C by "1", as illustrated by blocks 1130 and 1135.

Figure 3:
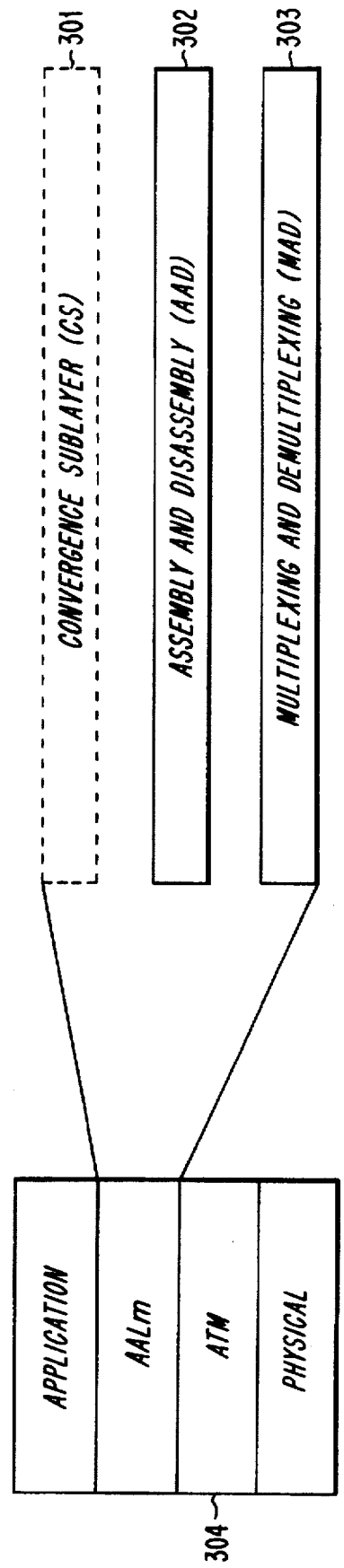
FIG. 3 is a block diagram illustrating the AALm sublayers.
Figure 4:
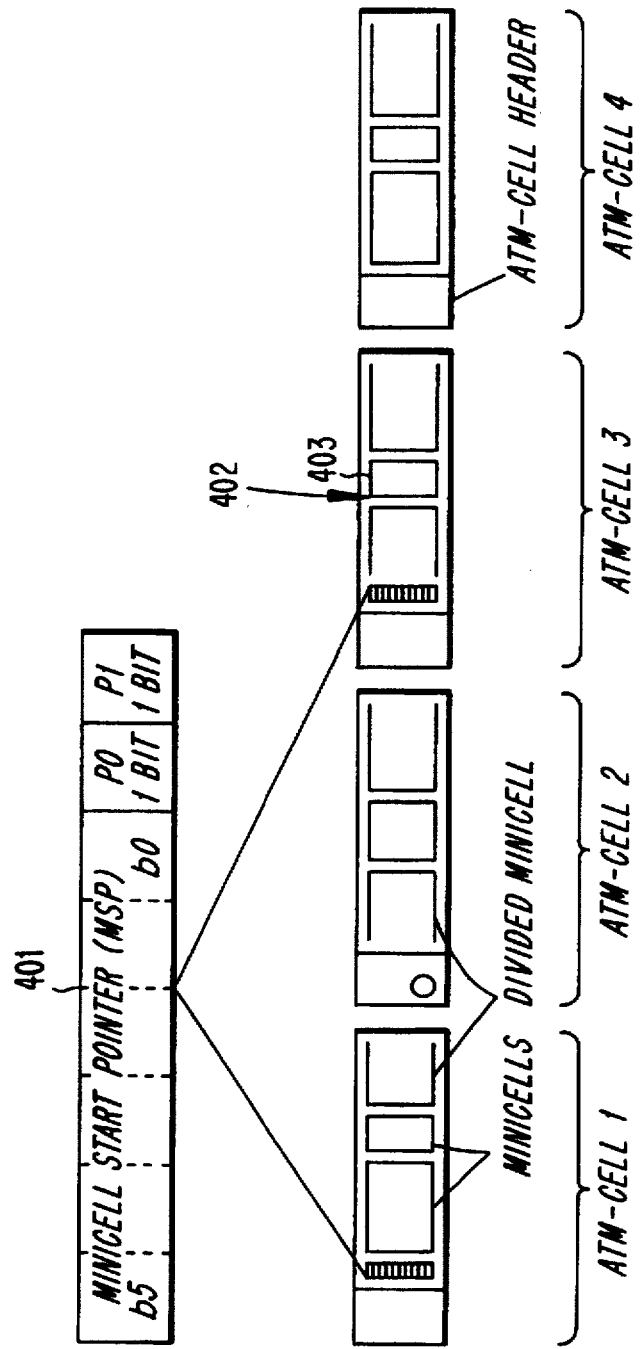
FIG. 4 is a diagram depicting the use of a minicell start pointer to help maintain minicell alignment.

If, after the MC/C is incremented, the value of the MC/C is not equal to the interval value I, as illustrated by the "NO" path out of decision block 1140, the AALm prepares and multiplexes the next minicell, as illustrated by blocks 1160 and 1165. If, after the MC/C is incremented, the value of the MC/C is equal to the interval value I, as illustrated by the "YES" path out of decision block 1140, the value of the MC/C is reset to "0", the value of the S/N counter is reset to "0", the AALm inserts the value stored in the S/N counter into the payload of the next minicell, and the AALm attaches the appropriate minicell header containing the predefined CID code, as illustrated by blocks 1145, 1150, and 1155 respectively. The AALm then multiplexes the minicell into the payload of the current ATM cell as illustrated by block 1165. Execution then proceeds to block 1130 and block 1135, where the S/N counter and MC/C are incremented by "1". Note that FIG. 11A does not illustrate the fact that once the AALm has filled the current ATM cell payload with minicells, the ATM layer 304 (refer to FIG. 3) will attach the appropriate ATM cell header and transmit the ATM cell to the receiving station.

Figure 12A:
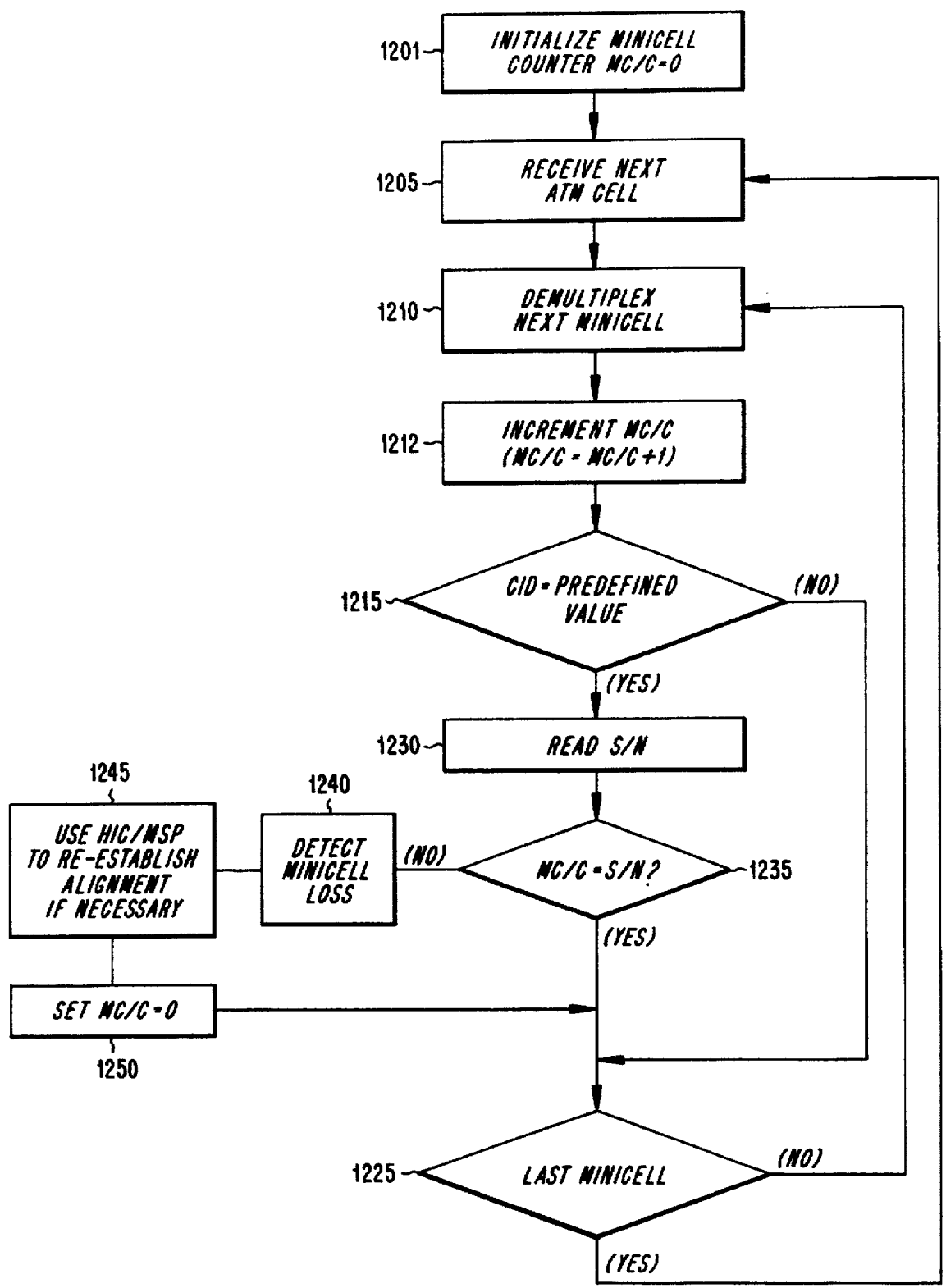
FIGS. 12A and 12B are flow charts illustrating two methods for receiving S/N fields in the payload of S/N minicells and using them to detect lost data.

FIG. 12A illustrates a method that could be used to implement the second exemplary embodiment with respect to the receiving station. A minicell counter (MC/C) is initialized, as illustrated in block 1201. The receiving station then receives the next ATM cell from the transmission station, as illustrated by block 1205, and the minicells contained therein are demultiplexed from the payload one by one, as illustrated by block 1210. The receiving station then increments MC/C, as illustrated by block 1212.

If the receiving station determines that the CID code in the header of the minicell is not equal to the predefined CID code that indicates whether a minicell is an SN minicell, as illustrated by the "NO" path out of decision block 1215, the receiving station checks if there are any more minicells in the ATM cell. If there are more minicells in the ATM cell, as illustrated by the "NO" path out of decision block 1225, the receiving station demultiplexes the next minicell. If there are no more minicells in the ATM cell, as illustrated by the "YES" path out of decision block 1225, the receiving station retrieves the next ATM cell.

If, however, the CID code in the next minicell does equal the predefined value identifying the minicell as a S/N minicell, as illustrated by the "YES" path out of decision block 1215, the receiving station will read the S/N field in the corresponding minicell payload, as illustrated by block 1230. The receiving station compares the value stored in the S/N field with the present value of the MC/C. If the two values are equal, as illustrated by the "YES" path out of decision block 1235, the receiving station presumes that no minicells have been lost, and proceeds to retrieve either the next minicell in the ATM cell or the next ATM cell, as illustrated by decision block 1225.

If the S/N field and the MC/C are not equal, as illustrated by the "NO" path out of decision block 1235, the receiving station presumes that minicells have been lost, and the method proceeds as described in the first exemplary embodiment, as illustrated by blocks 1240, 1245, and 1250.

This second exemplary embodiment provides the flexibility to decrease the predefined transmission interval between S/N fields such that more than one S/N minicell appears in an ATM cell. For example, in the first exemplary embodiment, an ATM cell interval of "1" results in one S/N field per ATM cell. In the second exemplary embodiment, it is possible to send more than one S/N field per ATM cell should the circumstances warrant such an interval. However, one skilled in the art will readily understand that doing so would take up valuable bandwidth.

Figure 13A:
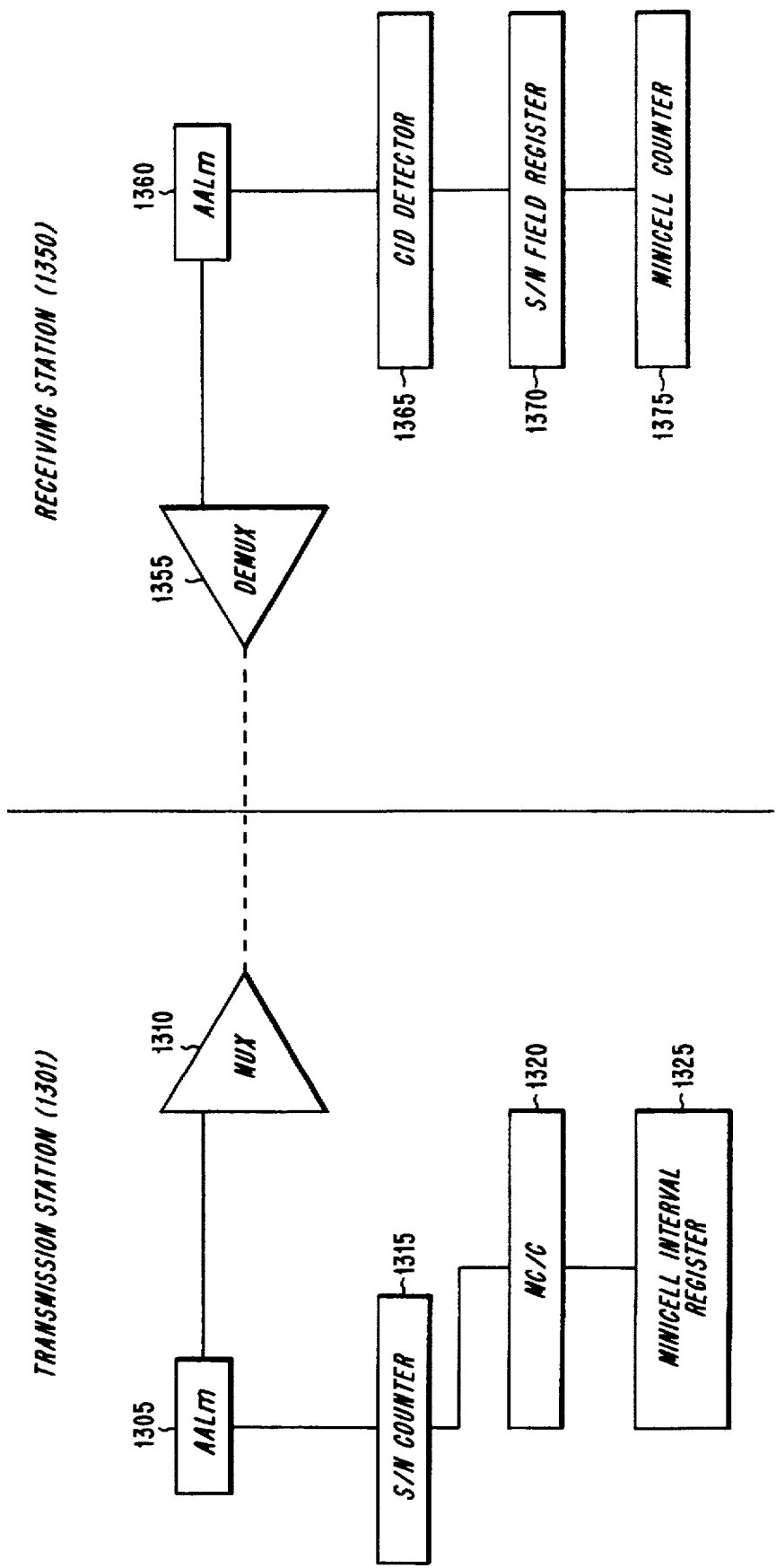
FIGS. 13A and 13B are block diagrams of an apparatus for transmitting and receiving an S/N field transported in the payload of a S/N minicell.

FIG. 13A illustrates a simple block diagram of an apparatus that may be employed for implementing the method of detecting lost minicells in accordance with the second exemplary embodiment. FIG. 13A shows that such an apparatus would contain the same type of components as the apparatus associated with the first exemplary embodiment. For example, the transmission station 1301 contains an AALm 1305 which prepares and generates minicells; a multiplexer 1310 for multiplexing the minicells into the payload of ATM cells; a S/N counter 1315 for maintaining the actual number of minicells transmitted; a minicell counter (MC/C) 1320 for keeping track of the minicell interval value; and a minicell interval register 1325 which contains the value of the predefined transmission interval set by the operator or the transmission station, as described above. The primary difference between the apparatus illustrated in FIG. 13A and the apparatus illustrated in FIG. 8A, is that the information stored in the various counters are used by the AALm, as illustrated, since it is the AALm that generates the minicells.

Likewise, the configuration of the receiving station apparatus 1350 is similar to the receiving apparatus 850 associated with the first exemplary embodiment illustrated in FIG. 8A. One difference is the receiving station 1350 contains a CID detector 1365 for determining whether the CID value of a present minicell is equal to the predefined CID value used to identify S/N minicells. The receiving station 1350 also contains a S/N field register 1370 and a minicell counter 1375. These components are utilized by the AALm 1360 since it is the AALm that demultiplexes the minicells from the ATM cell payload and decouples the data therefrom.

Figure 14:
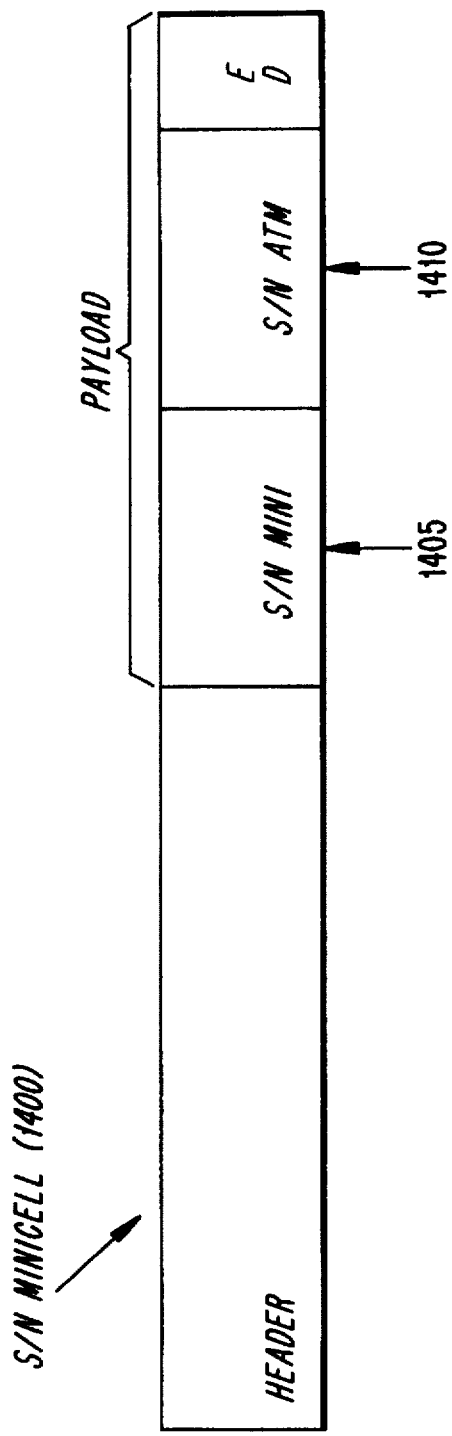
FIG. 14 illustrates the format of a S/N minicell containing a S/N field for both minicells and ATM cells.

FIG. 14 illustrates a S/N minicell 1400 that might be generated by yet a third exemplary embodiment of the present invention. In all respects, this embodiment is similar to the second exemplary embodiment, but for the fact that the minicell payload includes both a $S/N_{mini}$ field 1405 for tracking the number of minicells actually transmitted and a $S/N_{ATM}$ field 1410 for tracking the number of ATM cells that have been transmitted.

Figure 11B:
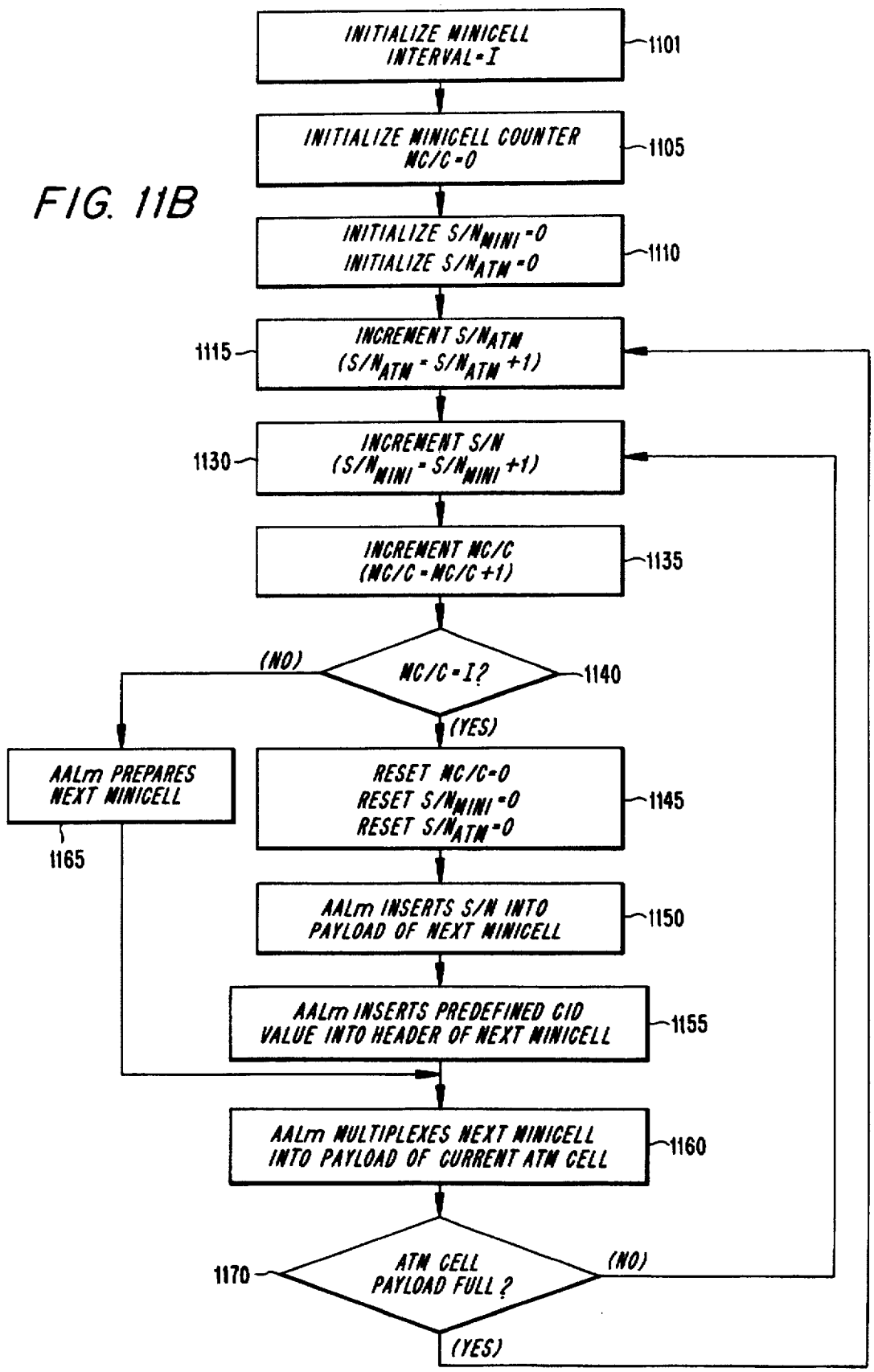
Figure 12B:
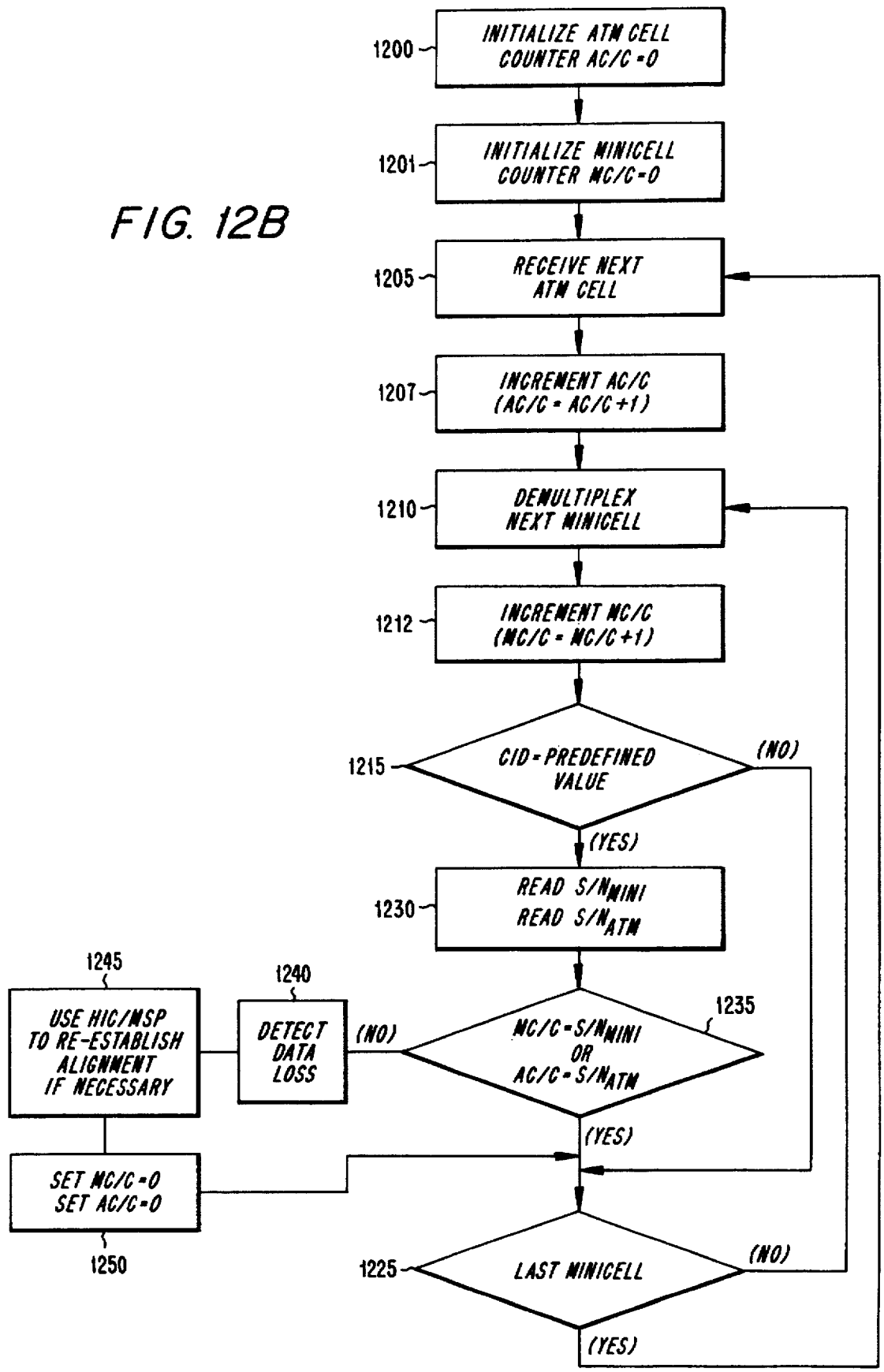

Exemplary methods for implementing this alternative embodiment, with respect to the transmitting station and the receiving station are illustrated in FIGS. 11B and 12B respectively. Note that the methods illustrated in FIGS. 11B and 12B are essentially the same as the methods illustrated in FIGS. 11A and 12A respectively. The primary difference between the two sets of figures, and their corresponding methods, is the presence of an additional counter $S/N_{ATM}$ in the transmitter and an additional ATM cell counter (AC/C) in the receiver which are needed to track the number of ATM cells that have been transmitted and received respectively.

Figure 13B:
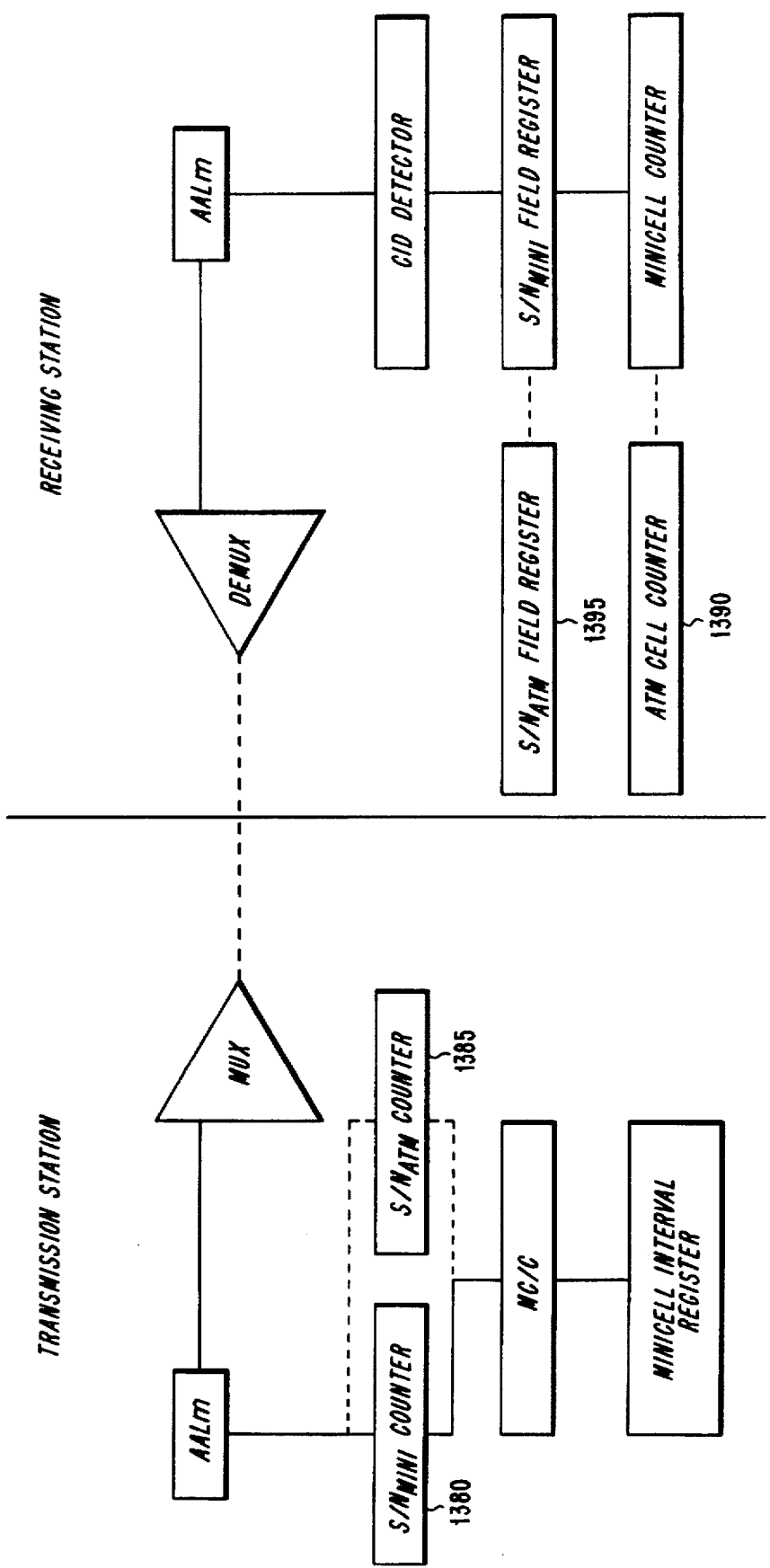

Similarly, FIG. 13B illustrates an apparatus that might be used to implement this alternative embodiment. Again, the apparatus illustrated in FIG. 13B is substantially similar to the apparatus shown in FIG. 13A, but for the addition of two separate counters in the transmission station: the $S/N_{mini}$ counter 1380 and the $S/N_{ATM}$ counter 1385, and the addition of an ATM cell counter 1390 and a $S/N_{ATM}$ field register 1395 in the receiving station.

FIGS. 15A and 15B similarly illustrate ATM cells 1500 and 1550 respectively in conjunction with a fourth exemplary embodiment. This fourth exemplary embodiment is similar to the first exemplary embodiment, but for the fact that the ATM cell payloads include both a $SN_{mini}$ field for tracking the number of minicells actually transmitted and a $SN_{ATM}$ field for tracking the number of ATM cells that have been transmitted.

Figure 6B:
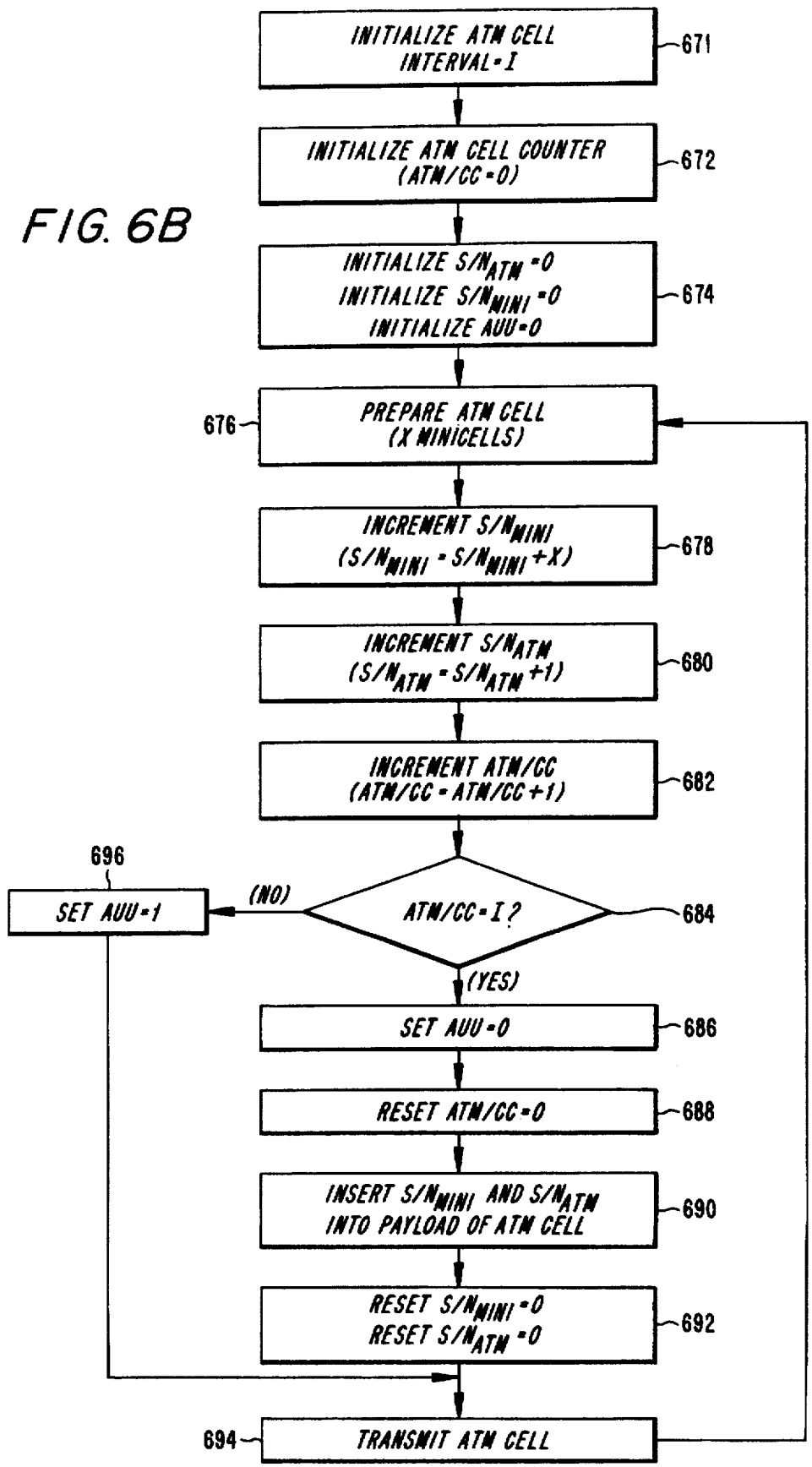
Figure 7B:
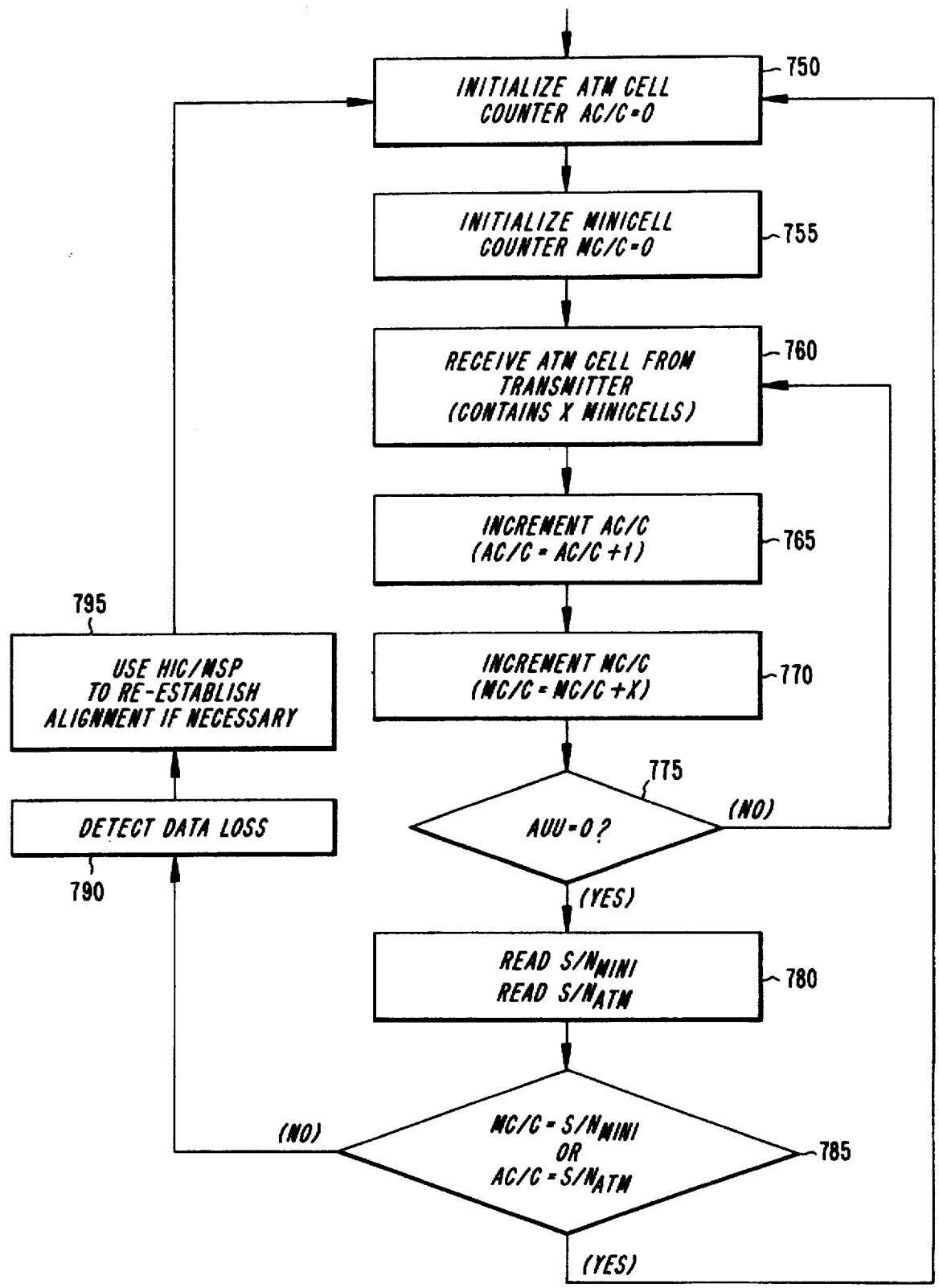

Exemplary methods for implementing this embodiment, with respect to the transmitting station and the receiving station are illustrated in FIGS. 6B and 7B respectively. Note that the methods illustrated in FIGS. 6B and 7B are essentially the same as the methods illustrated in FIGS. 6A and 7A respectively. The primary difference between the two sets of figures, and their corresponding methods, is the presence of an additional counter $S/N_{ATM}$ in the transmitter and an additional ATM cell counter (AC/C) in the receiver which are needed to track the number of ATM cells that have been transmitted and received respectively.

Similarly, FIG. 8B illustrates an apparatus that might be used to implement this embodiment. Again, the apparatus illustrated in FIG. 8B is substantially similar to the apparatus shown in FIG. 8A, but for the addition of two separate counters in the transmission station: the $S/N_{mini}$ counter 880 and the $S/N_{ATM}$ counter 885, and the addition of an ATM cell counter 890 and a $S/N_{ATM}$ field register 895 in the receiving station.

The main benefit provided by the exemplary embodiment of the present invention is increased bandwidth efficiency. In accordance with the first exemplary embodiment, for example, an ATM cell interval of 8, compared to a mandatory interval of 1 (prior method), bandwidth efficiency is improved by approximately 1 full percentage point. In accordance with the second exemplary embodiment, a minicell interval of 8 (i.e., inserting a S/N minicell every 8th minicell) improves bandwidth efficiency by approximately 0.2%. The other main benefit of the present invention, is that it gives the operator the flexibility to adjust the ATM cell or minicell interval, thereby providing improved bandwidth efficiency when the circumstances permit, and improved reliability, at the cost of bandwidth efficiency, when the quality of the transmission lines demands it.

The present invention has been described with reference to several exemplary embodiments. However, it will be readily apparent to those skilled in the art that it is possible to embody the invention in specific forms other than those of the exemplary embodiments described above. This may be done without departing from the spirit of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. In a telecommunication system that transports data packets from a sending station to a receiving station, a method for detecting lost data, comprising the steps of:

transporting at least one data cell that does not contain any data packet sequence number to a receiving station;

generating a data packet sequence number that represents a number of data packets transmitted via data cells to the receiving station;

inserting the data packet sequence number into a select data cell as a function of a predefined transmission interval;

generating a data cell sequence number that represents a number of data cells transmitted to the receiving station;

inserting the data cell sequence number into the select data cell as a function of the predefined transmission interval;

transporting the select data cell to a receiving station; and at the receiving station, determining whether data has been lost as a function of the data packet sequence number and the data cell sequence number.

2. The method of claim 1, wherein said data cells are Asynchronous Transfer Mode cells and said data packet is a minicell.

3. In a telecommunication system that transports data packets from a sending station to a receiving station, a method for detecting lost data, comprising the steps of:

generating a data packet sequence number that represents a number of data packets transmitted via data cells to the receiving station;

inserting the data packet sequence number into a select data cell as a function of a predefined and adjustable transmission interval;

transporting the data cell containing the data packet sequence number to a receiving station; and at the receiving station, determining whether data has been lost as a function of the data packet sequence number.

4. The method of claim 3 further comprising the steps of:

at the sending station, updating the data packet sequence number in response to the transportation of each data cell; and inserting an updated data packet sequence number into select data cells at the predefined and adjustable transmission interval.

5. The method of claim 3, wherein said step of determining whether data has been lost as a function of the data packet sequence number comprises the steps of:

tracking a number of data packets received by the receiving station;

comparing the number of data packets received with the data packet sequence number; and determining whether data has been lost as a function of said comparison between the number of data packets received and the data packet sequence number.

6. The method of claim 3, wherein said step of inserting the data packet sequence number into a select data cell as a function of a predefined and adjustable transmission interval comprises the step of:

inserting the data packet sequence number into a predefined location of a payload portion of the select data cell, wherein said data packets are minicells, said data cells are Asynchronous Transfer Mode (ATM) cells, and said transmission interval is measured by a number of ATM cells.

7. The method of claim 3, wherein said step of inserting the data packet sequence number into the select data cell as a function of the predefined and adjustable transmission interval comprises the steps of:

inserting the data packet sequence number into a sequence number minicell; and inserting the sequence number minicell into a payload portion of the data cell, wherein said data packets are minicells and said data cells are Asynchronous Transfer Mode (ATM) cells.

8. The method of claim 7, wherein said predefined and adjustable transmission interval is measured by a number of ATM cells.

9. The method of claim 7, wherein said predefined and adjustable transmission interval is measured by a number of minicells.

10. The method of claim 3 further comprising the steps of:

at the sending station, updating a data packet sequence number in response to the transportation of each data packet; and inserting the updated data packet sequence numbers at the predefined and adjustable transmission interval.

11. The method of claim 3 further comprising the steps of:

generating a data cell sequence number that represents a number of data cells transmitted to the receiving station;

inserting the data cell sequence number into the select data cell as a function of a predefined and adjustable transmission interval; and determining whether data has been lost as a function of the data cell sequence number.

12. The method of claim 11 further comprising the steps of:

updating the data cell sequence number in response to the transportation of each data cell; and inserting an updated data cell sequence number into select data cells at the predefined and adjustable transmission interval.

13. The method of claim 12, wherein said step of determining whether data has been lost as a function of the data cell sequence number comprises the steps of:

tracking a number of data cells received by the receiving station;

comparing the number of data cells received with a received data cell sequence number; and determining whether data has been lost as a function of said comparison between the number of data cells received and the data cell sequence number.

14. The method of claim 11, wherein said step of inserting the data cell sequence number into a select data cell as a function of a predefined and adjustable transmission interval comprises the step of:

inserting the data cell sequence number into a predefined location of a payload portion of the select data cell, wherein said data cells are ATM cells, and wherein said transmission interval is measured by a number of ATM cells.

15. The method of claim 11, wherein said step of inserting the data cell sequence number into a select data cell as a function of a predefined and adjustable transmission interval comprises the steps of:

inserting the data cell sequence number into a sequence number minicell; and inserting the sequence number minicell into a payload portion of the select data cell, wherein said data cells are ATM cells, and wherein said predefined and adjustable transmission interval is measured by a number of ATM cells.

16. The method of claim 3 further comprising the steps of:

generating a sequence identifier; and inserting the sequence number identifier into the select data cell, thereby indicating that the data cell contains a data packet sequence number.

17. In a telecommunication system that transports data packets from a sending station to a receiving station, an apparatus for detecting lost data comprising:

means for transporting a data cell that does not contain a data packet sequence number to a receiving station;

means for generating a data packet sequence number that represents a number of data packets transmitted via data cells to the receiving station;

means for inserting the data packet sequence number into a select data cell as a function of a predefined and adjustable transmission interval;

means for generating a data cell sequence number that represents a number of data cells transmitted to the receiving station;

means for inserting the data cell sequence number into the select data cell as a function of a predefined and adjustable transmission interval;

means for transporting the select data cell to a receiving station; and at the receiving station, means for determining whether data has been lost as a function of the data packet sequence number and the data cell sequence number.

18. The apparatus of claim 17, wherein said data cells are Asynchronous Transfer Mode cells and said data packet is a minicell.

19. In a telecommunication system that transports data packets from a sending station to a receiving station, an apparatus for detecting lost data comprising:

means for generating a data packet sequence number that represents a number of data packets transmitted via data cells to the receiving station;

means for inserting the data packet sequence number into a select data cell as a function of a predefined and adjustable transmission interval;

means for transporting the data cell containing the data packet sequence number to a receiving station; and means for determining whether data has been lost as a function of the data packet sequence number.

20. The apparatus of claim 19 further comprises:

means for updating the data packet sequence number with the transmission of each data cell; and means for inserting an updated data packet sequence number into select data cells at the predefined and adjustable transmission interval.

21. The apparatus of claim 20, wherein said means for determining whether data has been lost as a function of the data packet sequence number comprises:

means for tracking a number of data packets received by the receiving station;

means for comparing the number of data packets received with a data packet sequence number; and means for determining whether data has been lost as a function of said comparison between the number of data packets received and the data packet sequence number.

22. The apparatus of claim 19, wherein said means for inserting the data packet sequence number into a select data cell as a function of a predefined and adjustable transmission interval comprises:

means for inserting the data packet sequence number into a predefined location of a payload portion of the select data cell, wherein said data packets are minicells, wherein said data cells are ATM cells, and wherein said transmission interval is measured by a number of ATM cells.

23. The apparatus of claim 19, wherein said step of inserting the data packet sequence number into a select data cell as a function of a predefined and adjustable transmission interval comprises:

means for inserting the data packet sequence number into a sequence number minicell; and means for inserting the sequence number minicell into a payload portion of the data cell, wherein said data packets are minicells and said data cells are ATM cells.

24. The apparatus of claim 23, wherein said predefined and adjustable transmission interval is measured by a number of ATM cells.

25. The apparatus of claim 23, wherein said predefined and adjustable transmission interval is measured by a number of minicells.

26. The apparatus of claim 19 further comprising:

means for updating a data packet sequence number with the transmission of each data packet; and means for inserting the updated data packet sequence numbers at the predefined and adjustable transmission interval.

27. The apparatus of claim 19 further comprising:

means for generating a data cell sequence number that represents a number of data cells transmitted to the receiving station;

means for inserting the data cell sequence number into the select data cell as a function of a predefined and adjustable transmission interval; and means for determining whether data has been lost as a function of the data cell sequence number.

28. The apparatus of claim 27 further comprising:

means for updating the data cell sequence number with the transmission of each data cell; and means for inserting an updated data cell sequence number into select data cells at the predefined and adjustable transmission interval.

29. The apparatus of claim 28, wherein said means for determining whether data has been lost as a function of the data cell sequence number comprises:

means for tracking a number of data cells received by the receiving station;

means for comparing the number of data cells received with a data cell sequence number; and means for determining whether data has been lost as a function of said comparison between the number of data cells received and the data cell sequence number.

30. The apparatus of claim 27, wherein said means for inserting the data cell sequence number into a select data cell as a function of a predefined and adjustable transmission interval comprises:

means for inserting the data cell sequence number into a predefined location of a payload portion of the select data cell, wherein said data cells are ATM cells, and wherein said transmission interval is measured by a number of ATM cells.

31. The apparatus of claim 27, wherein said means for inserting the data cell sequence number into a select data cell as a function of a predefined and adjustable transmission interval comprises:

means for inserting the data cell sequence number into a sequence number minicell; and means for inserting the sequence number minicell into a payload portion of the select data cell, wherein said data cells are ATM cells, and wherein said predefined and adjustable transmission interval is measured by a number of ATM cells.

32. The apparatus of claim 19 further comprising:

means for generating a sequence identifier; and means for inserting the sequence number identifier into the select data cell, thereby indicating that the data cell contains a data packet sequence number.

* * * * *